US012299610B2

(12) United States Patent  (10) Patent No.: US 12,299,610 B2
Cortese et al.  (45) Date of Patent: May 13, 2025

(54) OPTIMIZED TASK GENERATION AND SCHEDULING OF AUTOMATED GUIDED CARTS USING OVERHEAD SENSOR SYSTEMS

(71) Applicant: Amazon Technologies, Inc., Seattle, WA (US)

(72) Inventors: Mario Cortese, Pisa (IT); Enrico Fortunato, Dublin (IE); Ajith Abhindranath, Hannover (DE); Roberto Biale, Asigliano Vercellese (IT); Stefano La Rovere, Bereldange (LU)

(73) Assignee: Amazon Technologies, Inc., Seattle, WA (US)

( * ) Notice: Subject to any disclaimer, the term of this patent is extended or adjusted under 35 U.S.C. 154(b) by 251 days.

(21) Appl. No.: 17/701,295

(22) Filed: Mar. 22, 2022

(65) Prior Publication Data

US 2023/0306325 A1  Sep. 28, 2023

(51) Int. Cl.
*G06Q 10/0631* (2023.01)
*G06Q 10/087* (2023.01)

(52) U.S. Cl.
CPC ..... *G06Q 10/06311* (2013.01); *G06Q 10/087* (2013.01)

(58) Field of Classification Search
None
See application file for complete search history.

(56) References Cited

U.S. PATENT DOCUMENTS

| | | | | |
|---|---|---|---|---|
| 9,487,356 | B1* | 11/2016 | Aggarwal | G05B 15/02 |
| 11,420,823 | B1* | 8/2022 | Mehta | B65G 47/50 |
| 11,772,832 | B1* | 10/2023 | Murch | B65B 5/02 |
| | | | | 53/415 |
| 2002/0059075 | A1 | 5/2002 | Schick et al. | |

(Continued)

FOREIGN PATENT DOCUMENTS

| | | |
|---|---|---|
| GB | 2528568 A | 1/2016 |
| WO | 2016145006 A1 | 9/2016 |

OTHER PUBLICATIONS

Bechtsis, Dimitrios, et al. "Sustainable supply chain management in the digitalisation era: The impact of Automated Guided Vehicles." Journal of Cleaner Production 142 (2017): 3970-3984. (Year: 2017).*

(Continued)

*Primary Examiner* — Darlene Garcia-Guerra
(74) *Attorney, Agent, or Firm* — Athorus, PLLC

(57) ABSTRACT

Systems and methods to generate and schedule tasks for automated guided carts (AGCs) may include an overhead sensor system, a warehouse management system, an order management system, and a traffic controller. The overhead sensor system may detect trolleys and totes positioned at various trolley locations within a material handling facility. Based on the sensor data and data associated with states of portions of the material handling facility, the order management system may generate logically feasible tasks to transport trolleys and totes within the facility, and may also sequence the tasks in a temporally feasible order. Then, the traffic controller may instruct execution of the sequence of tasks by AGCs to facilitate various material handling processes within the facility.

19 Claims, 12 Drawing Sheets

(56) References Cited

U.S. PATENT DOCUMENTS

| | | | |
|---|---|---|---|
| 2015/0353282 A1* | 12/2015 | Mansfield | B65G 1/0492 |
| | | | 700/214 |
| 2016/0266930 A1* | 9/2016 | Jones | G06Q 10/06311 |
| 2017/0227624 A1* | 8/2017 | Wulff | G01S 13/74 |
| 2017/0334696 A1* | 11/2017 | Otto | B66F 9/18 |
| 2019/0066041 A1* | 2/2019 | Hance | G06Q 10/083 |
| 2019/0088096 A1* | 3/2019 | King | G08B 13/19665 |
| 2020/0039747 A1* | 2/2020 | Ahmann | B65G 1/1375 |
| 2020/0283019 A1 | 9/2020 | Kampen et al. | |
| 2020/0302391 A1* | 9/2020 | Li | G06Q 30/06 |
| 2020/0316786 A1* | 10/2020 | Galluzzo | G05D 1/0297 |
| 2020/0320474 A1* | 10/2020 | Hong | G06Q 10/0875 |
| 2022/0073280 A1* | 3/2022 | Gentilini | B65G 1/1375 |
| 2022/0129010 A1 | 4/2022 | Prosser | |

OTHER PUBLICATIONS

Karabegović, I., et al. "The application of service robots for logistics in manufacturing processes." Advances in Production Engineering & Management 10.4 (2015) (Year: 2015).*

Digani, Valerio, et al. "Ensemble coordination approach in multi-AGV systems applied to industrial warehouses." IEEE Transactions on Automation Science and Engineering 12.3 (2015): 922-934 (Year: 2015).*

UKIPO Search Report dated Sep. 22, 2023, for Application No. GB2304085.0.

* cited by examiner

OPTIMIZED TASK GENERATION AND SCHEDULING OF AUTOMATED GUIDED CARTS USING OVERHEAD SENSOR SYSTEMS

BACKGROUND

Many companies may store, package, and ship items and/or groups of items from material handling facilities. For example, many companies may store items in a material handling facility and ship items to various destinations (e.g., customers, stores) from the material handling facility. Various material handling systems and processes, including receipt, sorting, storage, packing, shipping, or other processing of items within a material handling facility, often incur significant labor, cost, and time. Accordingly, there is a need for flexible and automated systems and methods to facilitate the various material handling processes within a material handling facility, thereby improving the speed and efficiency of such processes.

DETAILED DESCRIPTION

Figure 1:
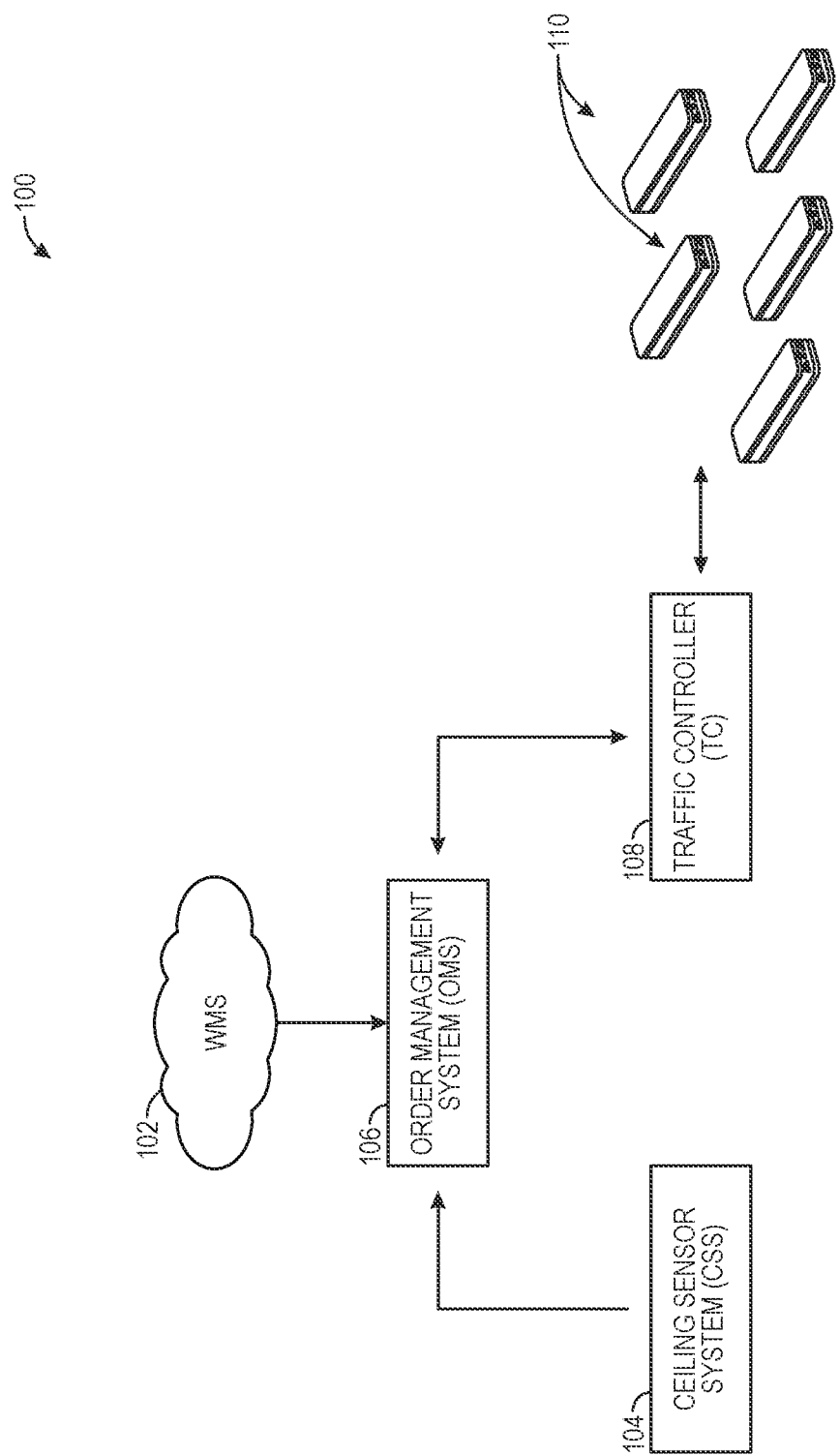
FIG. 1 is a block diagram of an example control system to generate and schedule tasks for automated guided carts, in accordance with implementations of the present disclosure.

As is set forth in greater detail below, implementations of the present disclosure are directed to systems and methods to optimize generation and scheduling of tasks for automated guided carts (AGCs) using overhead sensor systems.

In example embodiments, the systems and methods described herein may comprise overhead or ceiling sensor systems (CSS), automated guided carts (AGCs) that move or transport one or more trolleys and associated totes or containers, trolley locations associated with inbound areas, buffer areas, and processing stations within a material handling facility, and a control system to optimize task generation and scheduling of AGCs and trolleys among trolley locations based on data from the overhead sensor systems. Further, the control system may comprise a warehouse management system (WMS), the overhead sensor systems, an order management system including an Optimized AGC Task Scheduler (OATS), and a traffic controller, which may communicate with each other to generate and instruct tasks and schedules for various operations of the AGCs within the material handling facility.

The trolleys may comprise movable or rolling carts or wheeled platforms, and the trolleys may receive and carry one or more empty totes or containers, one or more full totes or containers, and/or no totes or containers. The AGCs may comprise automated mobile or transport robots or vehicles, and the AGCs may move or navigate under trolleys, engage or disengage trolleys, and move or transport the trolleys and associated totes or containers between various trolley locations within a material handling facility.

The overhead sensor systems may comprise one or more sensors, e.g., laser sensors, ranging sensors, distance sensors, or similar types of sensors, configured to detect trolleys, empty totes, and/or full totes. At the various trolley locations, the overhead sensor systems may detect presence or absence of trolleys, presence or absence of one or more totes, a number of empty totes, a number of full totes, or other aspects of trolleys and/or totes, e.g., based on ranging or distance data detected by the one or more sensors. In some examples, an overhead sensor system may include only a single sensor, e.g., a single laser sensor configured to detect a portion of a trolley and/or associated totes. In other examples, an overhead sensor system may include a plurality of sensors, e.g., a plurality of laser sensors configured to detect respective portions of a trolley and/or associated totes. For example, a trolley may be configured to receive four individual stacks of totes, and an overhead sensor system may include corresponding four sensors configured to detect respective individual stacks of totes associated with the trolley.

In example embodiments, based on data from the overhead sensor systems, as well as data from the WMS related to processing stations and other portions of a material handling facility, the control system, e.g., the order management system, may determine one or more orders or tasks to be assigned to one or more AGCs. For example, the various orders or tasks may generally relate to movement, pick up, transport, drop off, or other manipulation of one or more AGCs, trolleys, and associated totes or containers. In addition, various constraints, variables, or other factors, e.g., related to various order or task logic constraints, inbound areas, buffer areas, stations, trolley locations, transport paths, AGCs, trolleys, and/or other factors, may be considered by the order management system to generate the orders or tasks.

Further, the control system, e.g., the order management system, may determine one or more schedules for the orders or tasks to be assigned to one or more AGCs. For example, the various orders or tasks may generally be scheduled or sequenced in a temporal order to enable or facilitate completion thereof. In addition, various constraints, variables, or other factors, e.g., related to various space and/or time constraints, task sequences, rates of consumption or processing at stations or other areas, travel times, wait times, delays, and/or other factors, may be considered by the order management system to generate schedules or sequences of the orders or tasks.

Based on the optimized tasks and schedules generated by the order management system, the traffic controller may then instruct or command one or more AGCs to perform or execute the various orders or tasks according to the determined schedule or sequence by generating, planning, and instructing routes and paths for execution of the tasks by the AGCs.

Using the systems and methods described herein, various tasks or operations of AGCs within a material handling facility may be generated and sequenced in a substantially automated and optimized manner, based at least in part on data from overhead sensor systems related to states of AGCs, trolleys, and associated totes or containers at various trolley locations, and further based at least in part on states of inbound areas, processing stations, buffer areas, transport paths, and/or other portions of the material handling facility.

FIG. 1 is a block diagram 100 of an example control system to generate and schedule tasks for automated guided carts, in accordance with implementations of the present disclosure.

As shown in FIG. 1, the example control system may include a warehouse management system (WMS) 102, a ceiling or overhead sensor system (CSS) 104, an order management system (OMS) 106, a traffic controller (TC) 108, and one or more autonomous guided carts (AGCs) 110.

In example embodiments, the WMS 102 may comprise one or more processors and memories having one or more controllers, drivers, applications, programs, or algorithms configured to receive data from, process the data, and/or transmit instructions to various portions of a material handling facility. For example, the WMS 102 may communicate with one or more processing stations within the material handling facility. In addition, the WMS 102 may communicate with one or more portions of an inbound or receive area and/or various buffer areas. Further, the WMS 102 may communicate with one or more associates, robotic arms, automated machinery, conveyance mechanisms, or other apparatus, systems, or devices within the material handling facility. Moreover, the WMS 102 may receive data or information related to various states of processing stations, the inbound area, buffer areas, and/or various other apparatus, systems, devices, or portions of a material handling facility.

The CSS 104 may comprise a plurality of sensor apparatus, systems, or devices positioned within a material handling facility. For example, the plurality of sensor apparatus may be positioned over, above, or proximate a plurality of trolley locations, and the plurality of trolley locations may be associated with one or more of the inbound area, processing stations, and/or buffer areas. Each sensor apparatus may comprise one, two, three, four, or more individual sensors that are configured to detect ranging or distance data to one or more portions of a trolley location. For example, the sensors may comprise laser sensors, ranging sensors, distance sensors, proximity sensors, or other similar types of sensors. In addition, each trolley location may be configured to be empty, i.e., no trolley is present, receive an empty trolley, receive a trolley with one or more empty totes or containers, and/or receive a trolley with one or more full totes or containers. Further, each sensor apparatus may be configured to detect various states such as absence or presence of a trolley, a number of empty totes carried by a trolley, and/or a number of full totes carried by a trolley at a trolley location.

In example embodiments, the OMS 106 may comprise one or more processors and memories having one or more controllers, drivers, applications, programs, or algorithms, operating locally, remotely (e.g, in the cloud), or both, configured to receive data from the WMS 102 and CSS 104, process the data, and/or transmit instructions to the TC 108. For example, based on data from the WMS 102 and sensor data from the CSS 104, the OMS 106 may generate one or more orders or tasks to move one or more trolleys between one or more trolley locations. Generally, the generated tasks or orders described herein may comprise jobs, assignments, destinations, virtual links between locations, or other similar tasks or operations. In various examples, the orders or tasks may comprise picking up trolleys by AGCs, dropping off trolleys by AGCs, movement of AGCs without trolleys, movement of empty trolleys by AGCs, movement of trolleys having one or more empty totes by AGCs, movement of trolleys having one or more full totes by AGCs, and/or other orders or tasks. In addition, the orders or tasks may comprise movement of AGCs and/or trolleys between trolley locations associated with the inbound area, buffer areas, processing stations, and/or other portions of the material handling facility. Furthermore, the orders or tasks may be generated based on various factors, variables, or constraints, including various task logic constraints, among others.

In additional example embodiments, based on data from the WMS 102 and sensor data from the CSS 104, the OMS 106 may schedule or sequence the one or more generated orders or tasks to move one or more trolleys between one or more trolley locations. In various examples, the schedule or sequence of orders or tasks may comprise dropping off trolleys at trolley locations by AGCs only after transporting the trolleys to the trolley locations by the same AGCs, transporting trolleys away from trolley locations by AGCs only after picking up the trolleys from the trolley locations by the same AGCs, and transporting trolleys to trolley locations by AGCs only after defined delay times subsequent to removal of other trolleys from the trolley locations by other AGCs. In addition, the schedule or sequence of orders or tasks may be determined based on various rates of processing, waiting times, delay times, travel times, and/or others. Furthermore, the schedule or sequence of orders or tasks may be generated based on various factors, variables, or constraints, including various time or space constraints, among others.

In some example embodiments, the OMS 106 may comprise an Optimized AGC Task Scheduler (OATS) that is configured to generate the orders or tasks, and to schedule or sequence the generated orders or tasks, e.g., using a linear programming or optimization model. For example, the linear programming or optimization model may comprise a mixed integer, linear programming model. Some example linear programming or optimization models may include the CPLEX Optimization Studio by IBM, or the Gurobi Optimization Solver by Gurobi, among others.

The OMS 106 may transmit the generated schedule or sequence of orders or tasks to the TC 108, and the TC 108 may provide instructions to individual AGCs to perform or execute the orders or tasks according to the generated schedule or sequence by generating, planning, and instructing routes and paths for execution of the tasks by the AGCs. For example, the TC 108 may allocate the orders or tasks to individual AGCs 110, provide navigation, routing, or path planning instructions to the AGCs 110, receive data or information related to navigation and task performance of the AGCs 110, and/or provide updated or modified navigation, routing, or path planning instructions to the AGCs 110, in order to control and coordinate execution of the schedule or sequence of orders or tasks by the plurality of AGCs 110. Furthermore, based on the instructions received from the TC 108, the plurality of AGCs 110 may perform the various orders or tasks, including picking up trolleys by AGCs, dropping off trolleys by AGCs, movement of AGCs without trolleys, movement of empty trolleys by AGCs, movement of trolleys having one or more empty totes by AGCs, movement of trolleys having one or more full totes by AGCs, and/or other orders or tasks, according to the generated schedule or sequence from the OMS 106 and based on the instructed routes or paths from the TC 108.

Although FIG. 1 illustrates a particular number, type, configuration, and arrangement of various components of the example control system, other example embodiments may include various other numbers, types, configurations, arrangements, combinations, or modifications of one or more of the various components described herein.

Figure 2:
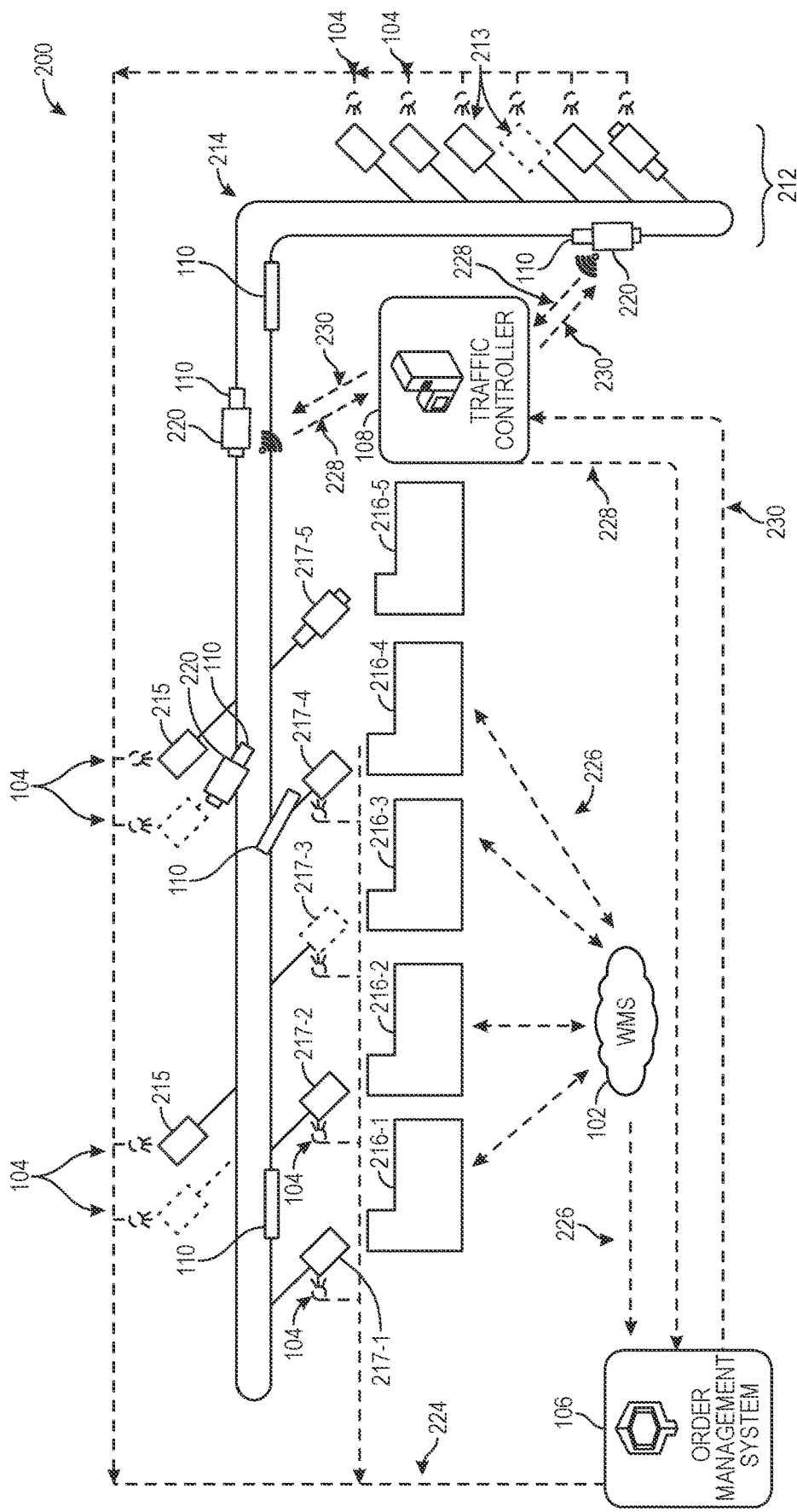
FIG. 2 is a schematic, overhead view diagram of an example environment including automated guided carts having tasks that are generated and scheduled using overhead sensor systems, in accordance with implementations of the present disclosure.

FIG. 2 is a schematic, overhead view diagram 200 of an example environment including automated guided carts having tasks that are generated and scheduled using overhead sensor systems, in accordance with implementations of the present disclosure.

As shown in FIG. 2, the example environment may include an inbound area 212 including associated trolley locations 213, a transport path 214 and associated trolley locations 215 in buffer areas, a plurality of processing stations 216 and associated trolley locations 217, and a plurality of trolleys 220 configured to receive one or more empty or full totes and also configured to be moved or transported by AGCs.

As described herein at least with respect to FIG. 1, the WMS 102 may communicate with the plurality of processing stations 216 and receive processing station data 226. The sensor apparatus of the CSS 104 may be positioned above, over, or proximate individual trolley locations 213, 215, 217 to detect trolleys, empty totes, and/or full totes at trolley locations. In addition, the OMS 106 may communicate with the WMS 102 to receive processing station data 226 and with the CSS 104 to receive sensor data 224. Further, the OMS 106 may communicate with the TC 108 and receive data 228 associated with AGCs 110, and transmit data or instructions 230 associated with a schedule or sequence of generated orders or tasks to the TC 108. Further, the TC 108 may communicate with the plurality of AGCs 110 to receive data 228 associated with the AGCs 110, and transmit data or instructions 230 to the AGCs 110 to perform or execute the schedule or sequence of generated orders or tasks.

In example embodiments, the inbound area 212 may comprise a receive, inbound, or induct area of the material handling facility at which one or more items, totes, and/or containers may be received, sorted, and inducted into the material handling facility. For example, various items, totes, and/or containers may be received via various shipping or transport vehicles or processes, and the items, totes, and/or containers may be sorted and inducted via one or more totes or containers into the material handling facility. For example, the totes or containers may be placed onto one or more trolleys 220 for induction into the material handling facility. In alternative example embodiments, the inbound area 212 may also comprise an outbound, shipping, or transport area of the material handling facility at which one or more totes or containers may be sorted, loaded, and transported to other parts of the material handling facility, and/or away from the material handling facility.

The inbound area 212 may include a plurality of trolley locations 213. As illustrated in FIG. 2, a solid line around a trolley location 213 may indicate presence of a trolley at the trolley location 213, and a dashed line around a trolley location 213 may indicate absence of a trolley at the trolley location 213. Above, over, or proximate each individual trolley location 213, a respective sensor apparatus of the CSS 104 may be positioned and configured to detect absence or presence of a trolley, a number of empty totes carried by a trolley, and/or a number of full totes carried by a trolley. The sensor apparatus positioned over the trolley locations 213 of the inbound area 212 may be substantially similar to the sensor apparatus described herein at least with respect to FIG. 3A. Further details of the inbound area 212 are described herein at least with respect to FIG. 4.

In example embodiments, the transport path 214 may comprise one or more paths, legs, highways, turns, loops, intersections, or other sections along which the AGCs 110 may travel or move. In addition, portions of the transport path 214 may generally extend to and/or under the plurality of trolley locations 213, 215, 217. In some examples, the AGCs 110 may move or navigate within the material handling facility by following magnetic tape, colored tape, barcodes, QR codes, fiducial markers, or other similar tapes, codes, or markers that define or delineate the transport path 214, e.g., using one or more magnetic sensors, imaging sensors, scanning sensors, radiofrequency identifier (RFID) readers, or other types of sensors associated with the AGCs 110. In addition, one or more labels, radiofrequency identifier (RFID) tags, symbols, indicia, or other identifiers may be positioned at various portions of the transport path 214, and the AGCs 110 may image, scan, read, or identify the various labels, tags, or identifiers during movement along the transport path 214, in order to navigate to a desired destination. In various examples, the various labels, tags, or identifiers may be associated with intersections, forks, dead ends, entry points or exit points relative to trolley locations, and/or various other portions of the transport path 214. In other example embodiments, AGCs 110 may move or navigate within the material handling facility using natural navigation, which may comprise navigation using SLAM (simultaneous localization and mapping) based on data from cameras, imaging sensors, LIDAR (light detection and ranging) sensors, or other types of time of flight sensors.

One or more portions of the transport path 214 may extend near or proximate one or more buffer areas, which may include a plurality of trolley locations 215. As illustrated in FIG. 2, a solid line around a trolley location 215 may indicate presence of a trolley at the trolley location 215, and a dashed line around a trolley location 215 may indicate absence of a trolley at the trolley location 215. Above, over, or proximate each individual trolley location 215, a respective sensor apparatus of the CSS 104 may be positioned and configured to detect absence or presence of a trolley, a number of empty totes carried by a trolley, and/or a number of full totes carried by a trolley. The sensor apparatus positioned over the trolley locations 215 of the one or more buffer areas along portions of the transport path 214 may be substantially similar to the sensor apparatus described herein at least with respect to FIG. 3B. Further details of the transport path 214 are described herein at least with respect to FIGS. 4-8, and further details of the buffer areas along the transport path 214 are described herein at least with respect to FIGS. 7 and 8.

In example embodiments, the plurality of processing stations 216 may comprise various item, tote, and/or container processing stations, e.g., picking, packing, sorting, inducting, storage, shipping, and/or various other types of processing stations within the material handling facility. For example, one or more full totes or containers may be removed from trolleys at the processing stations, one or more full totes or containers may be placed onto trolleys at the processing stations, one or more empty totes or containers may be removed from trolleys at the processing stations, one or more empty totes or containers may be placed onto trolleys at the processing stations, and/or various other operations may be performed with respect to items, totes, and/or containers between trolleys and processing stations. In the example of FIG. 2, the example environment includes five processing stations 216-1, 216-2, 216-3, 216-4, 216-5 having associated trolley locations 217-1, 217-2, 217-3, 217-4, 217-5.

The plurality of processing stations 216 may include a plurality of trolley locations 217. As illustrated in FIG. 2, a solid line around a trolley location 217 may indicate presence of a trolley at the trolley location 217, and a dashed line around a trolley location 217 may indicate absence of a trolley at the trolley location 217. Above, over, or proximate each individual trolley location 217, a respective sensor apparatus of the CSS 104 may be positioned and configured to detect absence or presence of a trolley, a number of empty totes carried by a trolley, and/or a number of full totes carried by a trolley. The sensor apparatus positioned over the trolley locations 217 of the plurality of processing stations 216 may be substantially similar to the sensor apparatus described herein at least with respect to FIG. 3A. Further details of the plurality of processing stations 216 are described herein at least with respect to FIG. 6.

In example embodiments, the plurality of trolleys 220 may comprise movable or rolling carts or wheeled platforms. For example, the trolleys 220 may include four, or other numbers, of legs, feet, skids, wheels, casters, rollers, or other rolling or sliding components. In addition, the trolleys 220 may include a platform, plate, deck, or other surface upon which one or more totes and/or containers may be placed, stacked, nested, or otherwise positioned. In the examples described herein, the surfaces of the trolleys 220 may be sized and configured to receive four individual stacks of totes, such as stacked, nested empty totes or stacked, full totes, in a 2×2 configuration or arrangement. In addition, the trolleys 220 may be configured to receive a maximum of 44 empty totes, e.g., four individual, nested stacks of eleven empty totes each, or to receive a maximum of 12 full totes, e.g., four individual stacks of three full totes each. Other example embodiments may include other numbers, configurations, or arrangements of stacks of totes.

The plurality of trolleys 220 may be engaged or disengaged by individual AGCs 110, in order to move or transport the trolleys 220 between locations within the material handling facility. In some examples, undersides of the trolleys 220 may include a hole, depression, orifice, or other engagement features, and the AGCs 110 may include an extendible and retractable post, pin, pole, beam, or other engagement features, such that upon extension of the post into a corresponding orifice, an AGC 110 may engage with and move a trolley 220, and upon retraction of the post from a corresponding orifice, an AGC 110 may disengage from and release a trolley 220. Other example embodiments may include other components, structures, or features to enable engagement or disengagement between individual AGCs 110 and trolleys 220, such as clips, clamps, hooks, tow hooks, lifting platforms or surfaces, or other types of engagement structures or features.

As further described herein, the OMS 106 may receive sensor data 224 from the sensor apparatus of the CSS 104, receive processing station data 226 from the WMS 102, and/or receive AGC data 228 from the TC 108. Then, the OMS 106 may process the received data 224, 226, 228 and generate a schedule of tasks to be executed by the AGCs 110. The OMS 106 may transmit the schedule of tasks to the TC 108, and the TC 108 may instruct individual AGCs 110 to perform tasks and operations according to the generated schedule. During execution of the generated schedule of tasks, the TC 108 may receive data from and transmit various updated or modified navigation or operational instructions to individual AGCs 110 to complete respective tasks. The various tasks may include movements of AGCs 110 without trolleys, picking up trolleys 220 by AGCs 110 from various trolley locations 213, 215, 217, movements of trolleys 220 by AGCs 110 between various trolley locations 213, 215, 217, dropping off trolleys 220 by AGCs 110 at various trolley locations 213, 215, 217, and/or various other operations.

As illustrated in the right side portion of FIG. 2 associated with the inbound area 212, an AGC 110 carrying a trolley 220 within the inbound area 212 may be transporting an empty trolley back to the inbound area 212. In addition, as illustrated in the upper right side portion of FIG. 2 associated with the inbound area 212, another AGC 110 without a trolley may be navigating toward the inbound area 212 to pick up a trolley with empty and/or full totes.

As illustrated in the upper right portion of FIG. 2 associated with the transport path 214 and buffer areas, an AGC 110 carrying a trolley 220 along the transport path 214 may be transporting a full or empty trolley to a trolley location 215 of a buffer area or to a trolley location 217 of a processing station 216. In addition, as illustrated in the upper middle portion of FIG. 2 associated with the transport path 214 and buffer areas, another AGC 110 carrying a trolley 220 may be entering or exiting a trolley location 215 of a buffer area, e.g., to drop off or pick up the trolley 220 relative to the trolley location 215.

As illustrated in the central portion of FIG. 2 associated with the processing stations 216, an AGC 110 without a trolley may be navigating to a processing station 216-2 to pick up a trolley from trolley location 217-2, another AGC 110 may be entering or exiting the trolley location 217-4 proximate processing station 216-4, e.g., to drop off or pick up the trolley 220 relative to the trolley location 217-4, and a further AGC 110 may be positioned within the trolley location 217-5 proximate processing station 216-5, e.g., to drop off or pick up the trolley 220 relative to the trolley location 217-5.

Although FIG. 2 illustrates a particular number, type, configuration, and arrangement of various components of the example environment, other example embodiments may include various other numbers, types, configurations, arrangements, combinations, or modifications of one or more of the various components described herein.

Figure 3B:
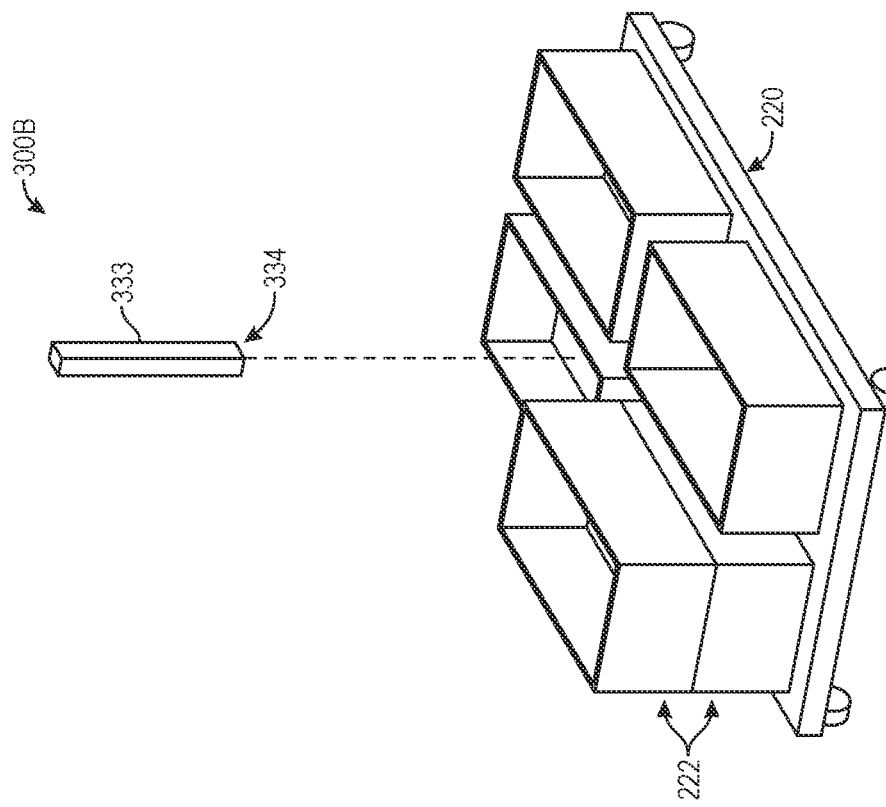
FIGS. 3A and 3B are schematic, perspective view diagrams of example overhead sensor systems, in accordance with implementations of the present disclosure.
Figure 3A:
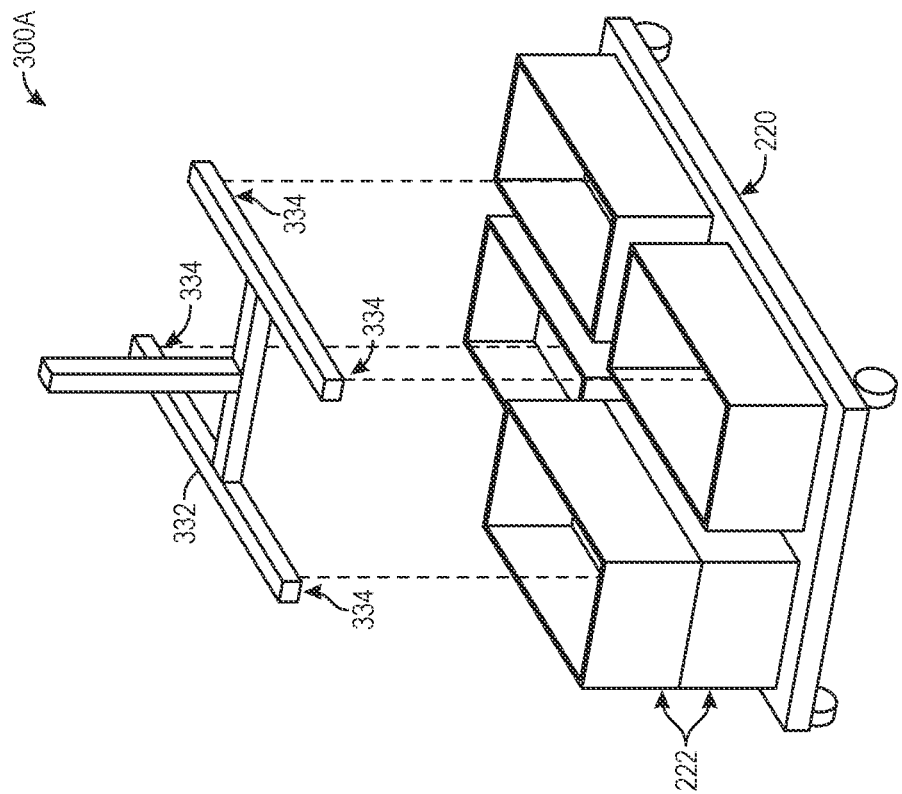

FIGS. 3A and 3B are schematic, perspective view diagrams 300A, 300B of example overhead sensor systems, in accordance with implementations of the present disclosure.

As shown in FIG. 3A, a sensor apparatus of the CSS 104 may comprise a structural frame 332 and a plurality of sensors 334 that are configured to detect respective portions of a trolley 220 having one or more totes or containers 222 positioned or stacked thereon.

The structural frame 332 may comprise a plurality of poles, beams, rods, or other structural elements that are coupled together to form the frame. Example embodiments of the structural frame 332 may include various shapes, such as rectangular, square, circular, oval, other polygonal, star, or other regular or irregular shapes. In the example shown in FIG. 3A, the frame 332 may form an H-shaped structure.

The plurality of sensors 334 may be positioned or coupled at the ends of portions of the H-shaped structure shown in FIG. 3A, and each of the sensors 334 may be in communication, via wired or wireless connections, with other portions of the material handling facility for receipt and/or transmission of power, data, and/or information. The sensors 334 may comprise laser sensors, distance sensors, proximity sensors, stereo imaging sensors, or various other types of ranging or distance sensors. Each of the sensors 334 may be positioned and oriented to detect a range or distance to a portion of a trolley 220, and/or one or more associated totes 222, positioned below the sensors 334, as indicated by the dashed lines in FIG. 3A. For example, the leftmost sensor 334 illustrated in FIG. 3A may detect a range or distance that corresponds to a height of two stacked totes 222 at a respective portion of the trolley 220, and each of the remaining three sensors 334 may detect a range or distance that corresponds to a height of a single tote 222 at respective portions of the trolley 220.

Based on the data from each of the sensors 334 coupled to the structural frame 332, individual sensors 334 may detect absence or presence of a trolley 220, a number of stacked, nested empty totes, and/or a number of stacked full totes at respective portions of the trolley position at which the trolley 220 is positioned.

As shown in FIG. 3B, a sensor apparatus of the CSS 104 may comprise a structural frame 333 and a sensor 334 that is configured to detect a portion of a trolley 220 having one or more totes or containers 222 positioned or stacked thereon.

The structural frame 333 may comprise one or more poles, beams, rods, or other structural elements that may be coupled together to form the frame. Example embodiments of the structural frame 333 may include various shapes, such as rectangular, square, circular, oval, other polygonal, star, or other regular or irregular shapes. In the example shown in FIG. 3B, the frame 333 may form an I-shaped, or dot-shaped, structure.

The sensor 334 may be positioned or coupled at an end of the I-shaped structure shown in FIG. 3B, and the sensor 334 may be in communication, via wired or wireless connections, with other portions of the material handling facility for receipt and/or transmission of power, data, and/or information. The sensor 334 may comprise a laser sensor, distance sensor, proximity sensor, stereo imaging sensors, or various other types of ranging or distance sensors. The sensor 334 may be positioned and oriented to detect a range or distance to a portion of a trolley 220, and/or one or more associated totes 222, positioned below the sensor 334, as indicated by the dashed line in FIG. 3B. For example, the sensor 334 illustrated in FIG. 3B may detect a range or distance that corresponds to a height of a single tote 222 at a respective portion of the trolley 220.

In some example embodiments, because the single sensor 334 of the I-shaped structural frame 333 of FIG. 3B detects a range or distance to only a single portion of a trolley 220, and a corresponding stack of empty or full totes at that respective portion, the OMS 106 may assume or determine that all other portions of a trolley 220 may include a same number of empty or full totes as the single, detected portion of the trolley 220. For example, if no trolley is detected by the sensor 334 at the detected portion of the trolley, it may be assumed that no trolley is present at the trolley location, and conversely, if a trolley is detected by the sensor 334 at the detected portion of the trolley, it may be assumed that a trolley is present at the trolley location. In addition, if a particular number of empty totes, e.g., three nested, empty totes, is present at the detected portion of the trolley, it may be assumed that all other portions of the trolley include the same number of empty totes as well, e.g., three nested, empty totes at each other portion. Likewise, if a particular number of full totes, e.g., two stacked full totes, is present at the detected portion of the trolley, it may be assumed that all other portions of the trolley include the same number of full totes as well, e.g., two stacked full totes at each other portion.

Based on the data from the sensor 334 coupled to the structural frame 333, the sensor 334 may detect absence or presence of a trolley 220, a number of stacked, nested empty totes, and/or a number of stacked full totes based on a detected portion of the trolley position at which the trolley 220 is positioned.

Although FIGS. 3A and 3B illustrate a particular number, type, configuration, and arrangement of various components of the example overhead or ceiling sensor systems, other example embodiments may include various other numbers, types, configurations, arrangements, combinations, or modifications of one or more of the various components described herein.

Figure 4:
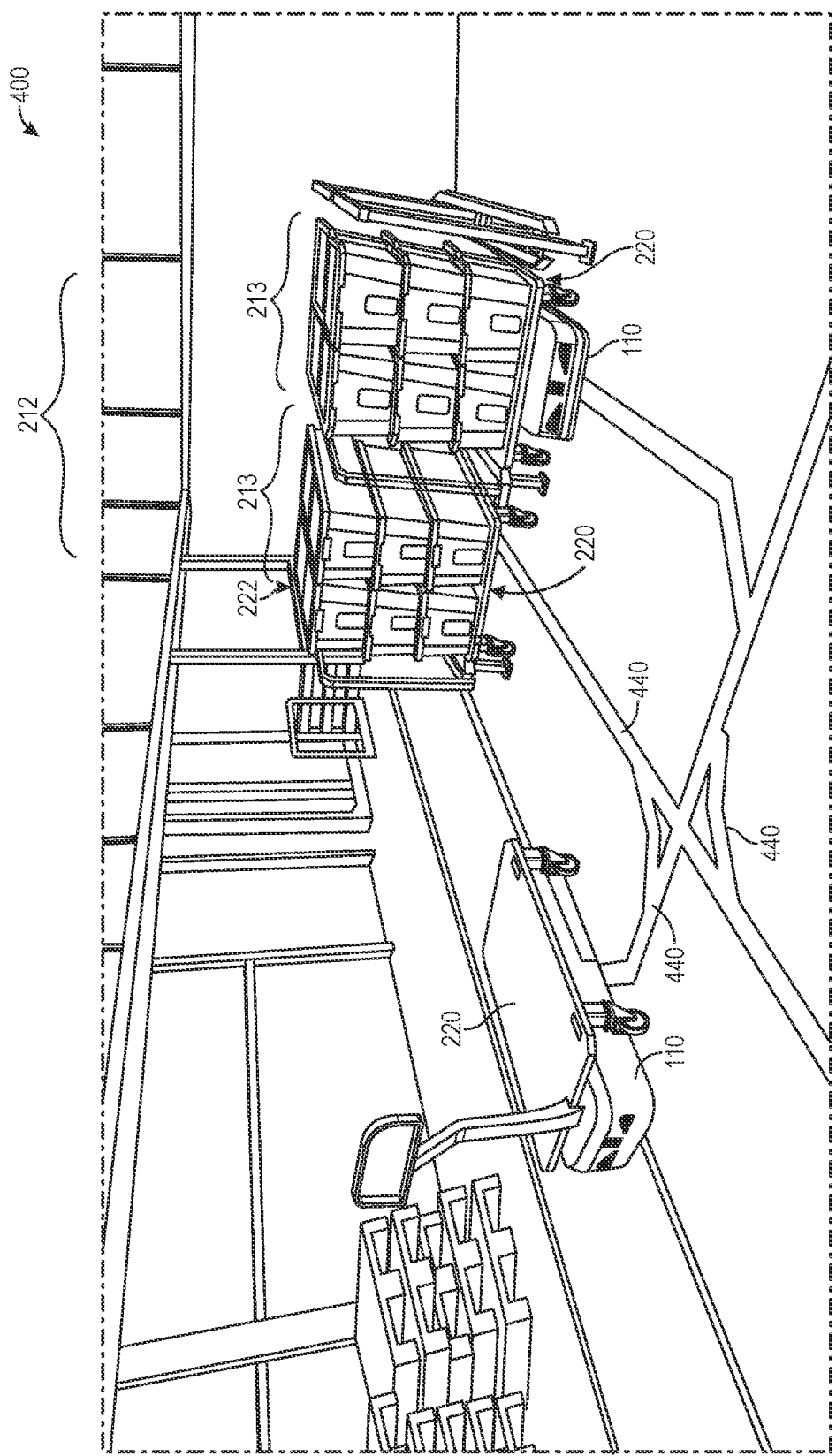
FIG. 4 is a schematic, perspective view diagram of an example inbound area of an environment including automated guided carts having tasks that are generated and scheduled using overhead sensor systems, in accordance with implementations of the present disclosure.

FIG. 4 is a schematic, perspective view diagram 400 of an example inbound area of an environment including automated guided carts having tasks that are generated and scheduled using overhead sensor systems, in accordance with implementations of the present disclosure.

As shown in FIG. 4, the example inbound area 212 may include a plurality of trolley locations 213 having associated overhead sensor apparatus (not shown) of the CSS 104. Each of the trolley locations 213 may receive a trolley 220, and each trolley 220 may receive one or more empty or full totes 222. As shown in FIG. 4, the trolleys 220 positioned at the trolley locations 213 may be substantially full trolleys having four individual stacks of three full totes 222 each.

One or more AGCs 110 may move or transport trolleys 220 and associated totes to and from the trolley locations 213 of the inbound area 212. For example, the AGCs 110 may include sensors to detect magnetic tape, labels, or other identifiers 440 that define or delineate a transport path 214 along the floor of the material handling facility, and also extend under trolley locations 213 at the inbound area 212. As shown, the transport path 214 may include various portions that connect, intersect, and extend in different directions to enable movement and transport of AGCs 110.

In the example shown in FIG. 4, the AGC 110 illustrated in the left side of FIG. 4 may be transporting an empty trolley 220 to or from the inbound area 212. In addition, the AGC 110 illustrated in the right side of FIG. 4 may be transporting the trolley 220 carrying twelve stacked, full totes 222 to or from the inbound area 212. As described herein, the AGCs 110 may be instructed to perform or execute various tasks with respect to the inbound area 212, including movement without trolleys, picking up trolleys, transporting trolleys, dropping off trolleys, and/or various other operations.

Although FIG. 4 illustrates a particular number, type, configuration, and arrangement of various components of the example inbound area, other example embodiments may include various other numbers, types, configurations, arrangements, combinations, or modifications of one or more of the various components described herein.

Figure 5:
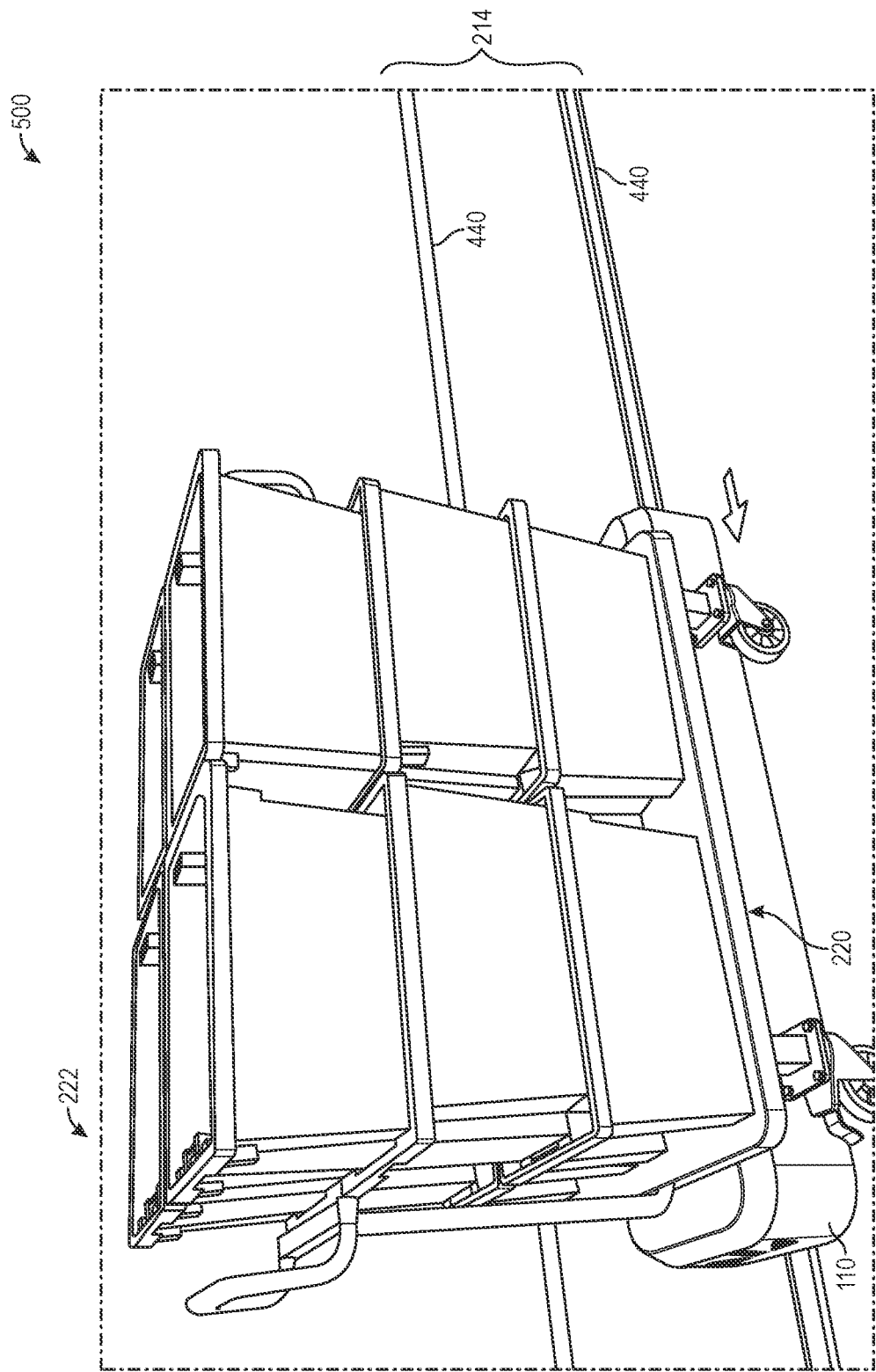
FIG. 5 is a schematic, perspective view diagram of an example transit area of an environment including automated guided carts having tasks that are generated and scheduled using overhead sensor systems, in accordance with implementations of the present disclosure.

FIG. 5 is a schematic, perspective view diagram 500 of an example transit area of an environment including automated guided carts having tasks that are generated and scheduled using overhead sensor systems, in accordance with implementations of the present disclosure.

As shown in FIG. 5, the example transit area or transport path 214 may include magnetic tape, labels, or other identifiers 440 that define or delineate a transport path 214 along the floor of the material handling facility. One or more AGCs 110 may move or transport trolleys 220 and associated totes 222 between trolley locations 213, 215, 217 of the material handling facility. For example, the AGCs 110 may include sensors to detect the magnetic tape, labels, or other identifiers 440 that define or delineate the transport path 214. As described herein, the transport path 214 may include various portions that connect, intersect, and extend in different directions to enable movement and transport of AGCs 110.

In the example shown in FIG. 5, the AGC 110 may be transporting the trolley 220 carrying twelve stacked, full totes 222 between trolley locations of an inbound area 212, a buffer area, and/or a processing station 216. As described herein, the AGCs 110 may be instructed to perform or execute various tasks by moving or traveling along the transport path 214, including movement without trolleys, picking up trolleys, transporting trolleys, dropping off trolleys, and/or various other operations.

Although FIG. 5 illustrates a particular number, type, configuration, and arrangement of various components of the example transport path, other example embodiments may include various other numbers, types, configurations, arrangements, combinations, or modifications of one or more of the various components described herein.

Figure 6:
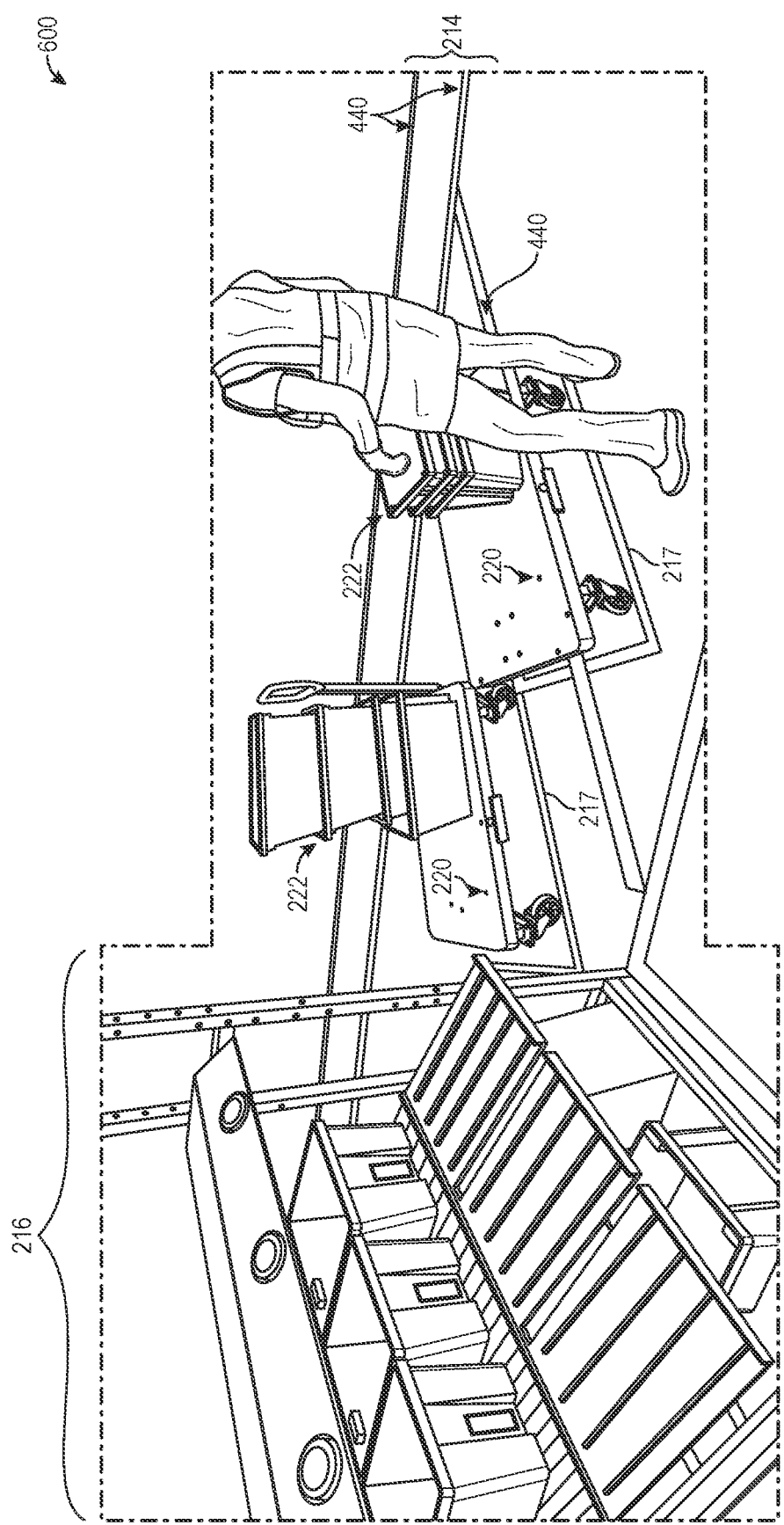
FIG. 6 is a schematic, perspective view diagram of an example processing station of an environment including automated guided carts having tasks that are generated and scheduled using overhead sensor systems, in accordance with implementations of the present disclosure.

FIG. 6 is a schematic, perspective view diagram 600 of an example processing station of an environment including automated guided carts having tasks that are generated and scheduled using overhead sensor systems, in accordance with implementations of the present disclosure.

As shown in FIG. 6, the example processing station 216 may include a plurality of trolley locations 217 having associated overhead sensor apparatus (not shown) of the CSS 104. In some examples, each processing station 216 may include at least two trolley locations 217, e.g., one to receive trolleys with full totes, and one to receive trolleys with empty totes. Each of the trolley locations 217 may receive a trolley 220, and each trolley 220 may receive one or more empty or full totes 222. As shown in FIG. 6, the trolley location 217 on the left side of FIG. 6 may generally receive trolleys with stacked, full totes, and the trolley location 217 on the right side of FIG. 6 may generally receive trolleys with nested, empty totes.

One or more AGCs 110 may move or transport trolleys 220 and associated totes to and from the trolley locations 217 of the processing station 216. For example, the AGCs 110 may include sensors to detect magnetic tape, labels, or other identifiers 440 that define or delineate a transport path 214 along the floor of the material handling facility, and also extend under trolley locations 217 at the processing station 216. As shown, the transport path 214 may include various portions that connect, intersect, and extend in different directions to enable movement and transport of AGCs 110.

In the example shown in FIG. 6, an AGC 110 may transport the trolley 220 on the left side of FIG. 6 with stacked, full totes to or from the trolley location 217 at the processing station 216, and the same or different AGC 110 may transport the trolley 220 on the right side of FIG. 6 with nested, empty totes to or from the trolley location 217 at the processing station 216. Depending upon the particular operations performed at the processing station 216, full totes may be input to the station for processing, and empty totes may be output from the station after processing. Alternatively, empty totes may be input to the station for processing, and full totes may be output from the station after processing. Various other types of operations may also be possible with respect to input and/or output of empty and/or full totes relative to a processing station 216. As described herein, the AGCs 110 may be instructed to perform or execute various tasks with respect to the processing station 216, including movement without trolleys, picking up trolleys, transporting trolleys, dropping off trolleys, and/or various other operations.

Although FIG. 6 illustrates a particular number, type, configuration, and arrangement of various components of the example processing station, other example embodiments may include various other numbers, types, configurations, arrangements, combinations, or modifications of one or more of the various components described herein.

Figure 7:
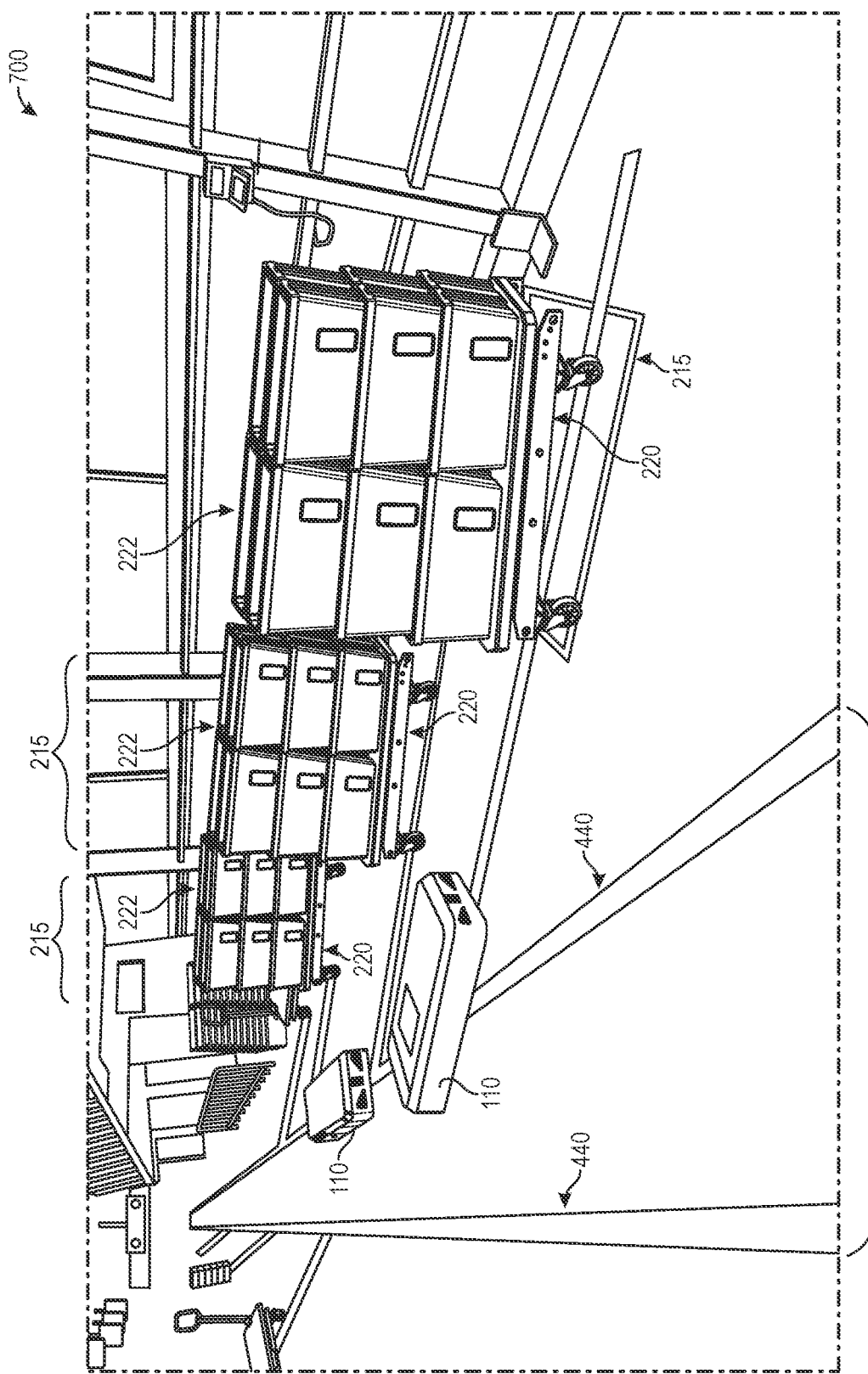
FIG. 7 is a schematic, perspective view diagram of an example buffer area of an environment including automated guided carts having tasks that are generated and scheduled using overhead sensor systems, in accordance with implementations of the present disclosure.

FIG. 7 is a schematic, perspective view diagram 700 of an example buffer area of an environment including automated guided carts having tasks that are generated and scheduled using overhead sensor systems, in accordance with implementations of the present disclosure.

As shown in FIG. 7, the example buffer area may include a plurality of trolley locations 215 having associated overhead sensor apparatus (not shown) of the CSS 104. Each of the trolley locations 215 may receive a trolley 220, and each trolley 220 may carry one or more empty or full totes 222. As shown in FIG. 7, the trolleys 220 positioned at the trolley locations 215 may be substantially full trolleys having four individual stacks of three full totes 222 each.

One or more AGCs 110 may move or transport trolleys 220 and associated totes to and from the trolley locations 215 of the buffer area. For example, the AGCs 110 may include sensors to detect magnetic tape, labels, or other identifiers 440 that define or delineate a transport path 214 along the floor of the material handling facility, and also extend under trolley locations 215 at the buffer area. As shown, the transport path 214 may include various portions that connect, intersect, and extend in different directions to enable movement and transport of AGCs 110.

In the example shown in FIG. 7, the AGCs 110 may be transporting full trolleys 220 to or from the trolley locations 215 of the buffer area. As described herein, the AGCs 110 may be instructed to perform or execute various tasks with respect to the buffer area, including movement without trolleys, picking up trolleys, transporting trolleys, dropping off trolleys, and/or various other operations.

Although FIG. 7 illustrates a particular number, type, configuration, and arrangement of various components of the example buffer area, other example embodiments may include various other numbers, types, configurations, arrangements, combinations, or modifications of one or more of the various components described herein.

Figure 8:
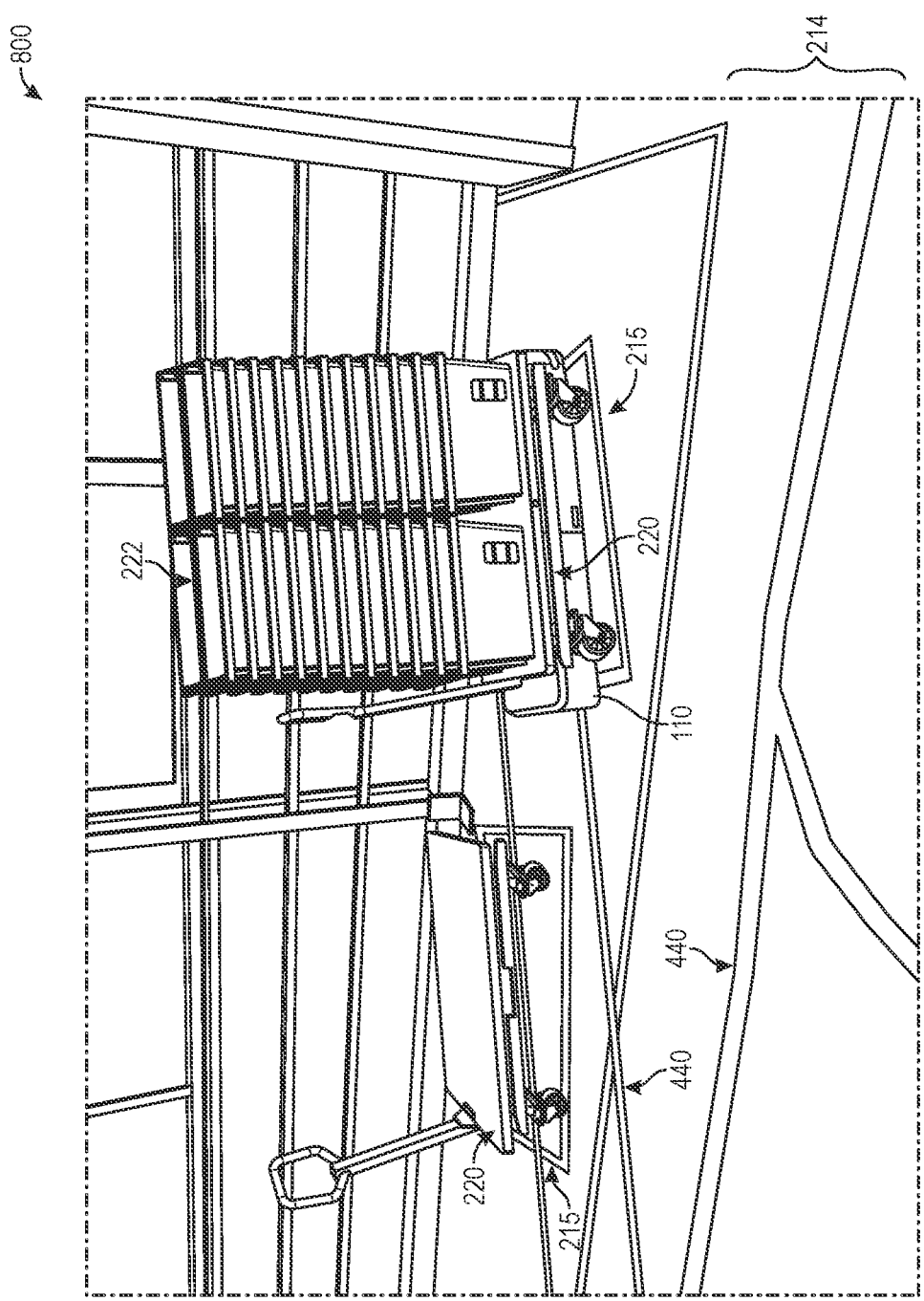
FIG. 8 is a schematic, perspective view diagram of another example buffer area of an environment including automated guided carts having tasks that are generated and scheduled using overhead sensor systems, in accordance with implementations of the present disclosure.

FIG. 8 is a schematic, perspective view diagram 800 of another example buffer area of an environment including automated guided carts having tasks that are generated and scheduled using overhead sensor systems, in accordance with implementations of the present disclosure.

As shown in FIG. 8, the example buffer area may include a plurality of trolley locations 215 having associated overhead sensor apparatus (not shown) of the CSS 104. Each of the trolley locations 215 may receive a trolley 220, and each trolley 220 may carry one or more empty or full totes 222. As shown in FIG. 8, the trolleys 220 positioned at the trolley locations 215 may be empty trolleys 220 or substantially full trolleys having four individual nested stacks of eleven empty totes 222 each.

One or more AGCs 110 may move or transport trolleys 220 and associated totes to and from the trolley locations 215 of the buffer area. For example, the AGCs 110 may include sensors to detect magnetic tape, labels, or other identifiers 440 that define or delineate a transport path 214 along the floor of the material handling facility, and also extend under trolley locations 215 at the buffer area. As shown, the transport path 214 may include various portions that connect, intersect, and extend in different directions to enable movement and transport of AGCs 110.

In the example shown in FIG. 8, the AGCs 110 may be transporting empty or full trolleys 220 to or from the trolley locations 215 of the buffer area. As described herein, the AGCs 110 may be instructed to perform or execute various tasks with respect to the buffer area, including movement without trolleys, picking up trolleys, transporting trolleys, dropping off trolleys, and/or various other operations.

Although FIG. 8 illustrates a particular number, type, configuration, and arrangement of various components of the example buffer area, other example embodiments may include various other numbers, types, configurations, arrangements, combinations, or modifications of one or more of the various components described herein.

Figure 9:
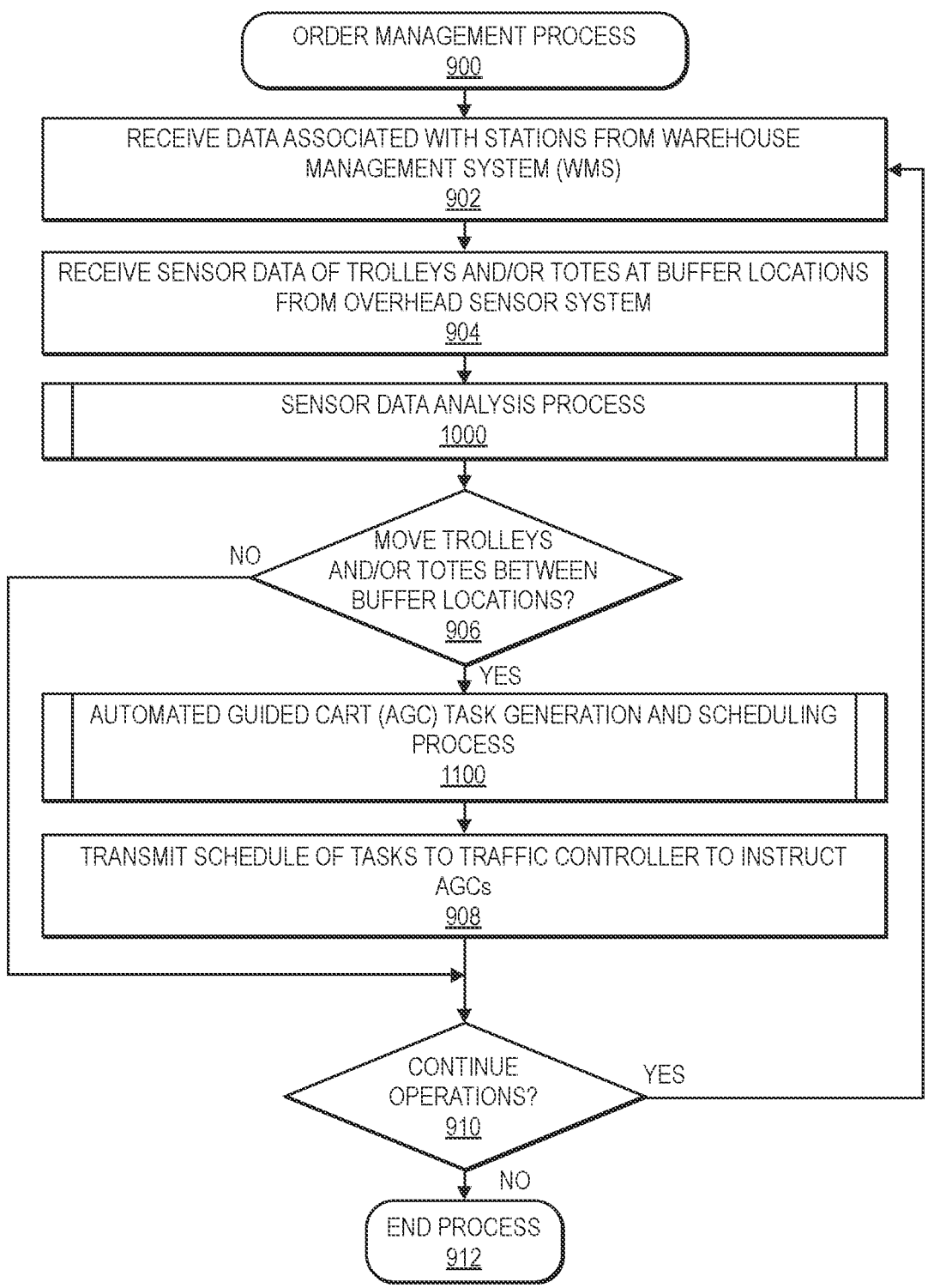
FIG. 9 is a flow diagram illustrating an example order management process, in accordance with implementations of the present disclosure.

FIG. 9 is a flow diagram illustrating an example order management process 900, in accordance with implementations of the present disclosure.

The process 900 may begin by receiving data associated with stations from the warehouse management system (WMS), as at 902. For example, the WMS may receive data associated with individual processing stations during various operations, and the data may relate to a number of processing stations, types of operations, operational status, rates of processing, and/or various other aspects related to tasks or operations of the processing stations. In addition, the data associated with processing stations may include data related to types of trolley locations, number of trolley locations, and/or various other aspects related to trolley locations associated with or proximate the processing stations. Further, the OMS may receive data associated with processing stations from the WMS.

The process 900 may continue by receiving sensor data of trolleys and/or totes at buffer locations from the overhead sensor system, as at 904. For example, individual sensor apparatus associated with various trolley (or buffer) locations within the material handling facility may be in communication with the OMS. The various trolley locations may be associated with the inbound area, buffer areas, and/or processing stations, and the individual sensor apparatus may have different structures or forms, e.g., as described with respect to FIGS. 3A and 3B. Each individual sensor apparatus of the ceiling (or overhead) sensor system may detect data associated with ranges or distances to one or more portions of a trolley location, trolley, and/or one or more totes or containers. Further, the OMS may receive sensor data associated with ranges or distances detected by the sensor apparatus of the CSS.

The process 900 may then proceed with a sensor data analysis process, as at 1000. For example, the analysis or processing of the sensor data from the CSS may determine absence or presence of trolleys at respective trolley locations. In addition, the analysis or processing of the sensor data from the CSS may also determine a type of totes, e.g., empty or full totes, and a number of such totes carried by trolleys at respective trolley locations. As described herein, the sensor data may be associated with various trolley locations at the inbound area, buffer areas, and/or processing stations, and the individual sensor apparatus may have different structures or forms, e.g., as described with respect to FIGS. 3A and 3B, each of which may affect the analysis or processing of the sensor data. Further, the OMS, and/or the OATS comprised therein, may analyze the sensor data to determine positions of trolleys and/or associated totes within the material handling facility. Further details of the sensor data analysis process 1000 are described herein at least with respect to FIG. 10.

The process 900 may then continue to determine whether to move trolleys and/or totes between buffer locations, as at 906. For example, based on the determined positions of trolleys and/or associated totes at one or more trolley (or buffer) locations, it may be determined whether one or more trolleys are to be moved or transported between trolley locations, e.g., between trolley locations at the inbound area, one or more buffer areas, and/or one or more processing stations. Various thresholds may be defined or configured in order to determine to move trolleys and/or totes between trolley locations. In some examples, one or more thresholds may relate to a number of totes or containers placed or loaded onto trolleys, e.g., approximately 8-12 loaded full totes, approximately 36-44 loaded empty totes, or other numbers, in response to which it may be determined to move the full (or substantially full) trolleys to other trolley locations. In other examples, one or more thresholds may relate to a number of totes or containers removed or unloaded from trolleys, e.g., approximately 0-4 remaining full totes, approximately 0-8 remaining empty totes, or other numbers, in response to which it may be determined to move the empty (or substantially empty) trolleys to other trolley locations. Moreover, the one or more thresholds may be varied or configured based on various factors, such as time to arrival of an AGC, distance to a next trolley location, available AGCs, rate of processing at a station, various other space or time factors, and/or other factors. Further, the OMS may determine whether to move trolleys and/or totes between trolley locations, e.g., based on one or more thresholds related to readiness for movement.

If it is determined that one or more trolleys and/or totes are to be moved between trolley (or buffer) locations, the process 900 may proceed to the automated guided cart (AGC) task generation and scheduling process, as at 1100. For example, the task generation and scheduling process may include determining candidate tasks using available AGCs to move trolleys and/or totes between trolley locations, e.g., based on one or more task logic constraints, and/or other factors, variables, or constraints. In addition, the task generation and scheduling process may include determining, based on the candidate tasks, a schedule or sequence of tasks using available AGCs to move trolleys and/or totes between trolley locations, e.g., based on one or more space or time constraints, and/or other factors, variables, or constraints. Generally, the task generation and scheduling process may generate a logically feasible set of candidate tasks for AGCs, which are then sequenced or scheduled into a temporally feasible sequence of tasks. Further, the OMS, and/or the OATS comprised therein, may generate a sequence of tasks for AGCs to move trolleys and/or totes within the material handling facility. Further details of the AGC task generation and scheduling process 1100 are described herein at least with respect to FIG. 11.

The process 900 may then continue with transmitting the schedule of tasks to the traffic controller to instruct the AGCs, as at 908. For example, the sequence or schedule of tasks generated by the OMS, e.g., the OATS comprised in the OMS, may be provided or transmitted to the TC. As described herein, the TC may be in communication with individual AGCs and receive data associated with navigation and/or operations of the AGCs. Based on the transmitted schedule of tasks, the TC may send data or instructions to individual AGCs to perform or execute the schedule of tasks, e.g., by providing navigation, routing, or path planning instructions, by providing engagement or disengagement instructions with respect to trolleys, by providing instructions related to timing of operations, such as waiting, delays, or other aspects related to timing, by controlling and coordinating simultaneous, concurrent, or overlapping operations of multiple AGCs, and/or various other types of instructions. Further, the OMS may transmit the schedule of tasks to the TC to instruct execution by the AGCs.

Responsive to transmission of the schedule of tasks to the TC, at step 908, and/or responsive to determining, at step 906, that one or more trolleys and/or totes are not to be moved between trolley locations, the process 900 may determine whether operations are to continue, as at 910. For example, if operations within the material handling facility, e.g., the inbound area, one or more buffer areas, one or more processing stations, and/or one or more AGCs that move therebetween, are to continue, the process 900 may return to step 902 to continue to receive data associated with processing stations, as well as sensor data associated with trolley locations, in order to generate additional or updated tasks to facilitate the operations within the material handling facility. Further, the OMS may determine whether operations are to continue within the material handling facility.

If, however, it is determined that operations are not to continue, then the process 900 may end, as at 912.

Figure 10:
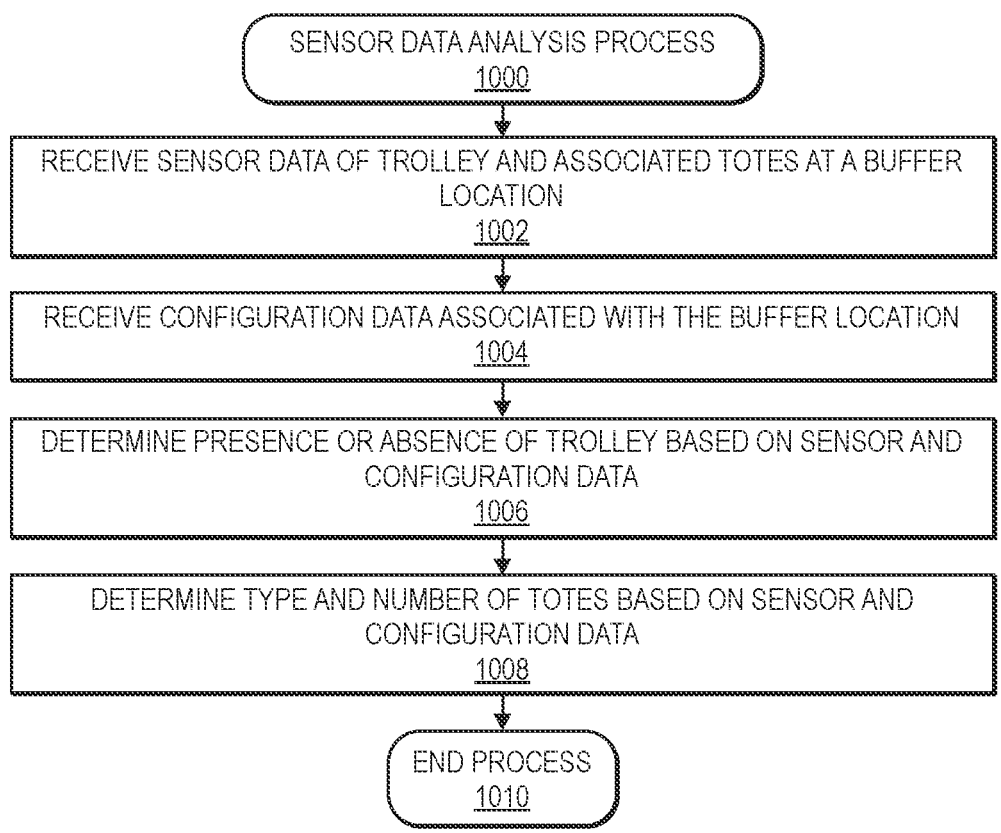
FIG. 10 is a flow diagram illustrating an example sensor data analysis process, in accordance with implementations of the present disclosure.

FIG. 10 is a flow diagram illustrating an example sensor data analysis process 1000, in accordance with implementations of the present disclosure.

The process 1000 may begin by receiving sensor data of a trolley and associated totes at a buffer location, as at 1002. For example, for an individual trolley (or buffer) location, a sensor apparatus of the CSS may be positioned overhead and detect ranges or distances to one or more portions of the trolley location, the trolley, and/or one or more totes carried by the trolley. The sensor data of ranges or distances may generally be associated with absence or presence of a trolley, a number of empty, nested totes at a particular portion of a trolley, and/or a number of full, stacked totes at a particular portion of a trolley. Further, the OMS, or the OATS comprised therein, may receive the sensor data of trolleys and associated totes at trolley locations.

The process 1000 may continue by receiving configuration data associated with the buffer location, as at 1004. For example, for an individual trolley (or buffer) location, the configuration data may indicate whether the trolley location is expected to receive empty, nested totes or full, stacked totes, and/or whether the trolley location is expected to output empty, nested totes or full, stacked totes. In some examples, trolley locations associated with the inbound area may generally be expected or configured to receive empty trolleys, and/or to output trolleys carrying full, stacked totes, e.g., for transport to buffer areas or processing stations. However, some trolley locations associated with the inbound area may be expected or configured to also receive trolleys carrying empty, nested totes, e.g., received from buffer areas or processing stations. In addition, trolley locations associated with buffer areas may generally be expected to receive empty trolleys, trolleys carrying empty, nested totes, trolleys carrying full, stacked totes, and/or all types of trolleys, and/or to output empty trolleys, trolleys carrying empty, nested totes, trolleys carrying full, stacked totes, and/or all types of trolleys.

Further, at least some trolley locations associated with processing stations may generally be expected or configured to receive trolleys carrying full, stacked totes, e.g., received from the inbound area or buffer areas for processing, and/or to output empty trolleys. Moreover, at least some other trolley locations associated with processing stations may be expected or configured to receive empty trolleys, and/or to output trolleys carrying empty, nested totes, e.g., for transport to buffer areas or the inbound area after processing. In alternative example embodiments, the trolley locations may be oppositely configured, e.g., some trolley locations configured to receive empty trolleys and output trolleys carrying full, stacked totes, and/or other trolley locations configured to receive trolleys carrying empty, nested totes and to output empty trolleys. Furthermore, the configuration data associated with various trolley locations within a material handling facility may be changed or modified over time, e.g., in response to changing needs or operations within the material handling facility. Further, the OMS, or the OATS comprised therein, may receive the configuration data associated with trolley locations.

The process 1000 may proceed by determining a presence or absence of a trolley based on sensor and configuration data, as at 1006. For example, for an individual trolley (or buffer) location, based on sensor data of ranges or distances to a trolley location, and potentially further based on configuration data of the trolley location, it may be determined whether a trolley is present or absent at the trolley location. In some examples in which a sensor apparatus of the CSS associated with the trolley location has multiple sensors, similar to that described with respect to FIG. 3A, the determination that a trolley is present or absent at the trolley location may be based on sensor data from the multiple sensors associated with respective multiple portions of the trolley location. In other examples in which a sensor apparatus of the CSS associated with the trolley location has a single sensor, similar to that described with respect to FIG. 3B, the determination that a trolley is present or absent at the trolley location may be based on sensor data from the single sensor associated with a portion of the trolley location, and further based on an assumption that other portions of the trolley location are the same as the detected portion. Further, the OMS, or the OATS comprised therein, may determine presence or absence of trolleys based on sensor and configuration data.

The process 1000 may then continue with determining a type and number of totes based on sensor and configuration data, as at 1008. As an initial matter, if a trolley is determined to not be present at the trolley location, a determination as to a type or number of totes may be skipped or omitted. If, however, a trolley is determined to be present at the trolley location, then for an individual trolley (or buffer) location, based on sensor data of ranges or distances to one or more totes carried by a trolley, and potentially further based on configuration data of the trolley location, a type and number of totes carried by the trolley may be determined. In some examples in which a sensor apparatus of the CSS associated with the trolley location has multiple sensors, similar to that described with respect to FIG. 3A, the determination of a type and number of totes carried by a trolley at the trolley location may be based on sensor data from the multiple sensors associated with respective multiple portions of the trolley location. In other examples in which a sensor apparatus of the CSS associated with the trolley location has a single sensor, similar to that described with respect to FIG. 3B, the determination of a type and number of totes carried by a trolley at the trolley location may be based on sensor data from the single sensor associated with a portion of the trolley location, and further based on an assumption that other portions of the trolley location include the same type and number of totes as the detected portion. Further, the OMS, or the OATS comprised therein, may determine a type and number of totes carried by trolleys based on sensor and configuration data.

The process 1000 may then end, as at 1010.

Figure 11:
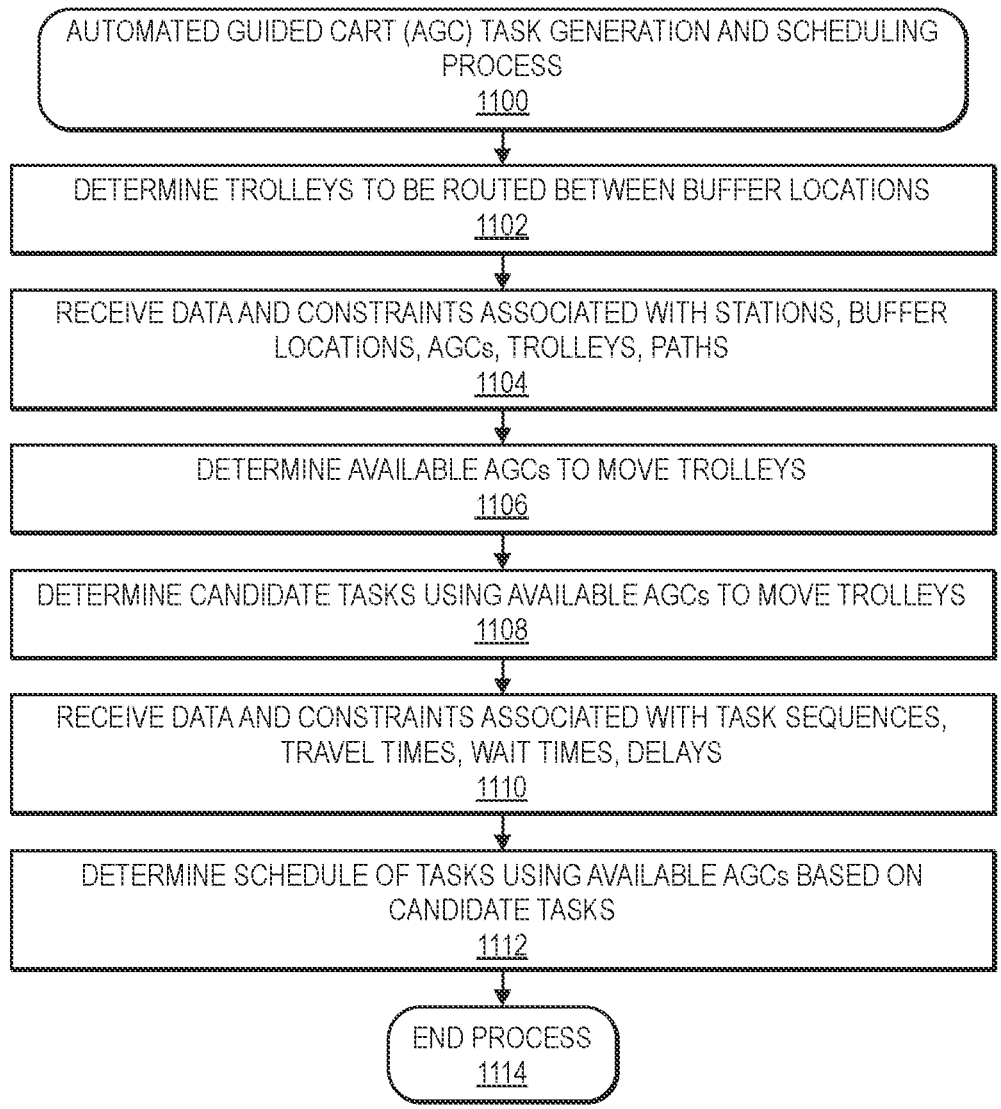
FIG. 11 is a flow diagram illustrating an example automated guided cart task generation and scheduling process, in accordance with implementations of the present disclosure.

FIG. 11 is a flow diagram illustrating an example automated guided cart task generation and scheduling process 1100, in accordance with implementations of the present disclosure.

The process 1100 may begin by determining trolleys to be routed between buffer locations, as at 1102. For example, based on the outputs of the sensor data analysis process 1000, one or more trolleys may be determined or selected for movement or transport between one or more trolley (or buffer) locations. As described herein, the one or more trolleys may be determined or selected based on comparisons between the outputs of the sensor data analysis process 1000 and one or more thresholds related to numbers of totes associated with trolleys, as well as various other factors related to AGCs, trolley locations, processing stations, various space or time factors, and/or others. Further, the OMS, or the OATS comprised therein, may determine one or more trolleys and associated totes to move between trolley locations.

The process 1100 may continue by receiving data and constraints associated with stations, buffer locations, AGCs, trolleys, and paths, as at 1104. For example, one or more factors, variables, and/or constraints may be received related to transport of trolleys and associated totes between trolley (or buffer) locations. The factors, variables, and/or constraints may comprise operational status of processing stations, trolley locations, the inbound area, paths, and/or other portions of the material handling facility, available transport paths for AGCs and/or trolleys between one or more trolley locations, and/or various other physical or logical factors or constraints related to movement of AGCs and/or trolleys. Further, the OMS, or the OATS comprised therein, may receive data or constraints associated with various components or portions of the systems and environments described herein.

The process 1100 may proceed by determining available AGCs to move trolleys, as at 1106. For example, one or more AGCs may not be operational, whereas other AGCs may be operational and available. In addition, some AGCs may be currently performing or executing other tasks, such that those AGCs are unavailable. Further, some AGCs may be positioned within the material handling facility, such that they are effectively blocked or unavailable for certain tasks. Various other factors may be used to determine one or more AGCs that are available to move trolleys. Further, the OMS, or the OATS comprised therein, may determine available AGCs to move one or more trolleys and associated totes between trolley locations.

The process 1100 may then continue to determine candidate tasks using available AGCs to move trolleys, as at 1108. For example, based on the received data and constraints, and further based on the available AGCs, one or more candidate tasks may be determined to move one or more trolleys and associated totes between trolley locations. Generally, the candidate tasks may include movement of an AGC without a trolley, or movement of an AGC with a trolley and any associated totes. In addition, the candidate tasks may include movement of an AGC between the inbound area, one or more buffer areas, and/or one or more processing stations. Further, the candidate tasks may not cause positioning of multiple AGCs along a same portion of the transport path, or at a same trolley location, at the same time. Similarly, the candidate tasks may not cause positioning of multiple trolleys along a same portion of the transport path, or at a same trolley location, at the same time. Moreover, the candidate tasks may include various combinations of different tasks to move one or more trolleys and associated totes between trolley locations. Further, the OMS, or the OATS comprised therein, may determine candidate tasks using available AGCs to move one or more trolleys and associated totes between trolley locations.

In additional example embodiments, the candidate tasks associated with trolley locations of processing stations, buffer areas, and/or the inbound area may generally comprise two primary tasks, including picking up a trolley from a trolley location and dropping off a trolley to a trolley location. Moreover, the task of picking up a trolley from a trolley location may be further subdivided into moving to the trolley location without a trolley, and moving away from the trolley location with the trolley. Likewise, the task of dropping off a trolley to a trolley location may be further subdivided into moving to the trolley location with a trolley, and moving away from the trolley location without the trolley.

Generally, the candidate tasks may comprise orders or tasks that may be logically feasible. However, the candidate tasks may not be feasible in relation to space and time, unless the candidate tasks are scheduled or sequenced in a proper temporal order. For example, if a trolley is already positioned at a trolley location, the task of picking up the trolley from the trolley location is temporally feasible, but the task of dropping off a trolley to the trolley location is not temporally feasible until the trolley already at the trolley location is removed. Likewise, if a trolley is not already positioned at a trolley location, the task of dropping off a trolley to the trolley location is temporally feasible, but the task of picking up a trolley from the trolley location is not temporally feasible until a trolley has been positioned at the trolley location.

The process 1100 may then proceed to receive data and constraints associated with task sequences, travel times, wait times, delays, etc., as at 1110. For example, one or more factors, variables, and/or constraints related to time and space may be received with respect to transporting trolleys and associated totes between trolley (or buffer) locations. The factors, variables, and/or constraints may comprise positions of AGCs and/or trolleys along portions of the transport path and/or at trolley locations at particular times, rates of processing of processing stations, trolley locations, the inbound area, paths, and/or other portions of the material handling facility, waiting times at trolley locations, trolley pick up times from trolley locations, trolley drop off times at trolley locations, travel times between trolley locations, waiting or delay times due to blockage or congestion along transport paths, and/or various other space or time factors or constraints related to temporal order of orders or tasks. Further, the OMS, or the OATS comprised therein, may receive data or constraints associated with task sequences and various space or time factors, variables, or constraints.

The process 1100 may then continue with determining a schedule of tasks using available AGCs based on the candidate tasks, as at 1112. For example, based on the candidate tasks and further based on the various data or constraints associated with task sequences and various space or time factors, variables, or constraints, a sequence or schedule or tasks may be determined or generated to move one or more trolleys and associated totes between trolley locations. As described herein, in some example embodiments, the OMS may comprise an Optimized AGC Task Scheduler (OATS) that is configured to generate the orders or tasks, and to schedule or sequence the generated orders or tasks, e.g., using a linear programming or optimization model. For example, the linear programming or optimization model may comprise a mixed integer, linear programming model. Some example linear programming or optimization models may include the CPLEX Optimization Studio by IBM, or the Gurobi Optimization Solver by Gurobi, among others.

The process 1100 may then end, as at 1114.

In example embodiments, the OATS may comprise a task scheduling controller that models available tasks as a directed graph to find optimal AGC tasks and to sequence the tasks, e.g., as a mixed integer linear programming problem. As a result, the OATS may solve the mixed integer problem to generate and assign orders or tasks to particular AGCs in a feasible temporal order based on real-world space and time constraints.

In additional example embodiments, in order to generate the sequence or schedule of tasks, the variables related to waiting time for an AGC at a trolley location, trolley pick up time from a trolley location, and trolley drop off time at a trolley location may comprise continuous variables that ensure that each task is completed in a correct, or feasible, temporal order. Further, such variables may be continuous in order to schedule or sequence the tasks with minimal or reduced waiting or delay times.

In further example embodiments, in order to generate the sequence or schedule of tasks, the constraints may generally comprise three primary temporal constraints, including allowing an AGC to pick up and move away from a trolley location with a trolley only after the same AGC arrives at the trolley location without a trolley, allowing an AGC to arrive at a trolley location with a trolley only after a defined time or delay following pick up and removal of a previous trolley by a previous AGC from the trolley location, and allowing an AGC to drop off and move away from a trolley location without a trolley only after the same AGC arrives at the trolley location with a trolley. Furthermore, the temporal constraints may prevent collisions or interferences between AGCs and/or trolleys at the same trolley location (or along same portions of the transport path) at the same time, as well as prevent temporally infeasible sequences or schedules of orders or tasks.

In alternative example embodiments, instead of utilizing OATS to generate and assign orders or tasks to particular AGCs in a feasible temporal order, sequence, or schedule based on real-world space and time constraints, a model predictive controller (MPC) may define the system as a linear, time-discrete state propagation model. The inputs and states of the MPC may be discrete, and a cost function may be applied to each state and input individually. In addition, an extra cost may be applied to a final state. Thus, the temporal constraints described in relation to OATS may instead be described by the discrete states and time, along with a limited predicted time horizon, when utilizing MPC. As a result, the MPC may also return an optimal sequence or schedule of orders or tasks for AGCs, similar to the output from the OATS.

Figure 12:
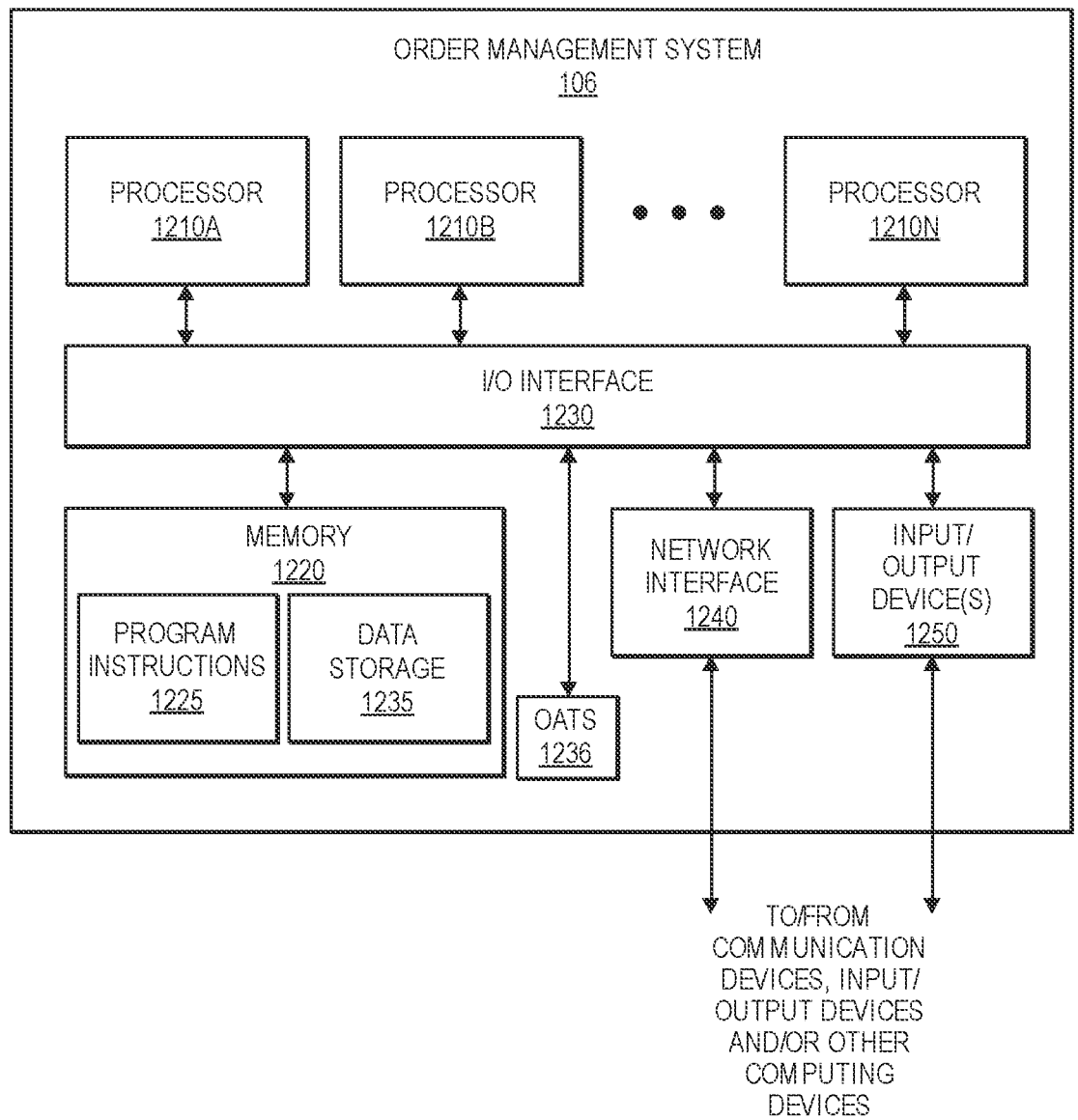
FIG. 12 is a block diagram illustrating various components of an example order management system, in accordance with implementations of the present disclosure.

FIG. 12 is a block diagram illustrating various components of an example order management system 106, in accordance with implementations of the present disclosure.

Various operations of an order management system, control system, or controller 106, such as those described herein, may be executed on one or more computer systems, and/or interacting with various other computers, systems, or devices in a material handling facility, according to various implementations. For example, the order management system, control system, or controller 106 discussed above may function and operate on one or more computer systems. One such order management system, control system, or controller 106 is illustrated by the block diagram in FIG. 12. In the illustrated implementation, a control system 106 includes one or more processors 1210A, 1210B through 1210N, coupled to a non-transitory computer-readable storage medium 1220 via an input/output (I/O) interface 1230. The control system 106 further includes a network interface 1240 coupled to the I/O interface 1230, and one or more input/output devices 1250. In some implementations, it is contemplated that a described implementation may be implemented using a single instance of the control system 106 while, in other implementations, multiple such systems or multiple nodes making up the control system 106 may be configured to host different portions or instances of the described implementations. For example, in one implementation, some data sources or services (e.g., related to portions of optimized task generation and scheduling systems, operations, or processes, etc.) may be implemented via one or more nodes of the control system 106 that are distinct from those nodes implementing other data sources or services (e.g., related to other portions of optimized task generation and scheduling systems, operations, or processes, etc.).

In various implementations, the control system 106 may be a uniprocessor system including one processor 1210A, or a multiprocessor system including several processors 1210A-1210N (e.g., two, four, eight, or another suitable number). The processors 1210A-1210N may be any suitable processor capable of executing instructions. For example, in various implementations, the processors 1210A-1210N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1210A-1210N may commonly, but not necessarily, implement the same ISA.

The non-transitory computer-readable storage medium 1220 may be configured to store executable instructions and/or data accessible by the one or more processors 1210A-1210N. In various implementations, the non-transitory computer-readable storage medium 1220 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 1220 as program instructions 1225 and data storage 1235, respectively. In other implementations, program instructions and/or data may be received, sent or stored upon different types of computer-accessible media, such as non-transitory media, or on similar media separate from the non-transitory computer-readable storage medium 1220 or the control system 106. Generally speaking, a non-transitory, computer-readable storage medium may include storage media or memory media such as magnetic or optical media, e.g., disk or CD/DVD-ROM, coupled to the control system 106 via the I/O interface 1230. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1240.

In one implementation, the I/O interface 1230 may be configured to coordinate I/O traffic between the processors 1210A-1210N, the non-transitory computer-readable storage medium 1220, and any peripheral devices, including the network interface 1240 or other peripheral interfaces, such as input/output devices 1250. In some implementations, the I/O interface 1230 may perform any necessary protocol, timing or other data transformations to convert data signals from one component (e.g., non-transitory computer-readable storage medium 1220) into a format suitable for use by another component (e.g., processors 1210A-1210N). In some implementations, the I/O interface 1230 may include support for devices attached through various types of peripheral buses, such as a variant of the Peripheral Component Interconnect (PCI) bus standard or the Universal Serial Bus (USB) standard, for example. In some implementations, the function of the I/O interface 1230 may be split into two or more separate components, such as a north bridge and a south bridge, for example. Also, in some implementations, some or all of the functionality of the I/O interface 1230, such as an interface to the non-transitory computer-readable storage medium 1220, may be incorporated directly into the processors 1210A-1210N.

The order management system 106 may also include an Optimized AGC Task Scheduler (OATS) 1236 that is configured to generate the orders or tasks, and to schedule or sequence the generated orders or tasks, using a linear programming or optimization model. As described herein, the OATS 1236 may comprise a task scheduling controller that models available tasks as a directed graph to find optimal AGC tasks and to sequence the tasks, e.g., as a mixed integer linear programming problem. As a result, the OATS 1236 may solve the mixed integer problem to generate and assign orders or tasks to particular AGCs in a feasible temporal order based on real-world space and time constraints. In some example embodiments, the linear programming or optimization model may comprise a mixed integer, linear programming model, such as the CPLEX Optimization Studio by IBM, or the Gurobi Optimization Solver by Gurobi.

The network interface 1240 may be configured to allow data to be exchanged between the control system 106 and other devices attached to a network, such as other control systems, material handling system controllers, warehouse management systems, overhead or ceiling sensor systems, traffic controllers, other computer systems, robotic arms, machines, or systems, automated guided carts (AGCs), various types of sensors, various types of vision systems, imaging devices, or scanning devices, RFID tags and readers, various stations or processes, or between nodes of the control system 106. In various implementations, the network interface 1240 may support communication via wired or wireless general data networks, such as any suitable type of Ethernet network.

Input/output devices 1250 may, in some implementations, include one or more displays, monitors, touchscreens, projection devices, other video input/output devices, microphones, speakers, other audio input/output devices, keyboards, keypads, touchpads, scanning devices, imaging devices, sensors, photo eyes, proximity sensors, RFID readers, voice or optical recognition devices, or any other devices suitable for entering or retrieving data by one or more control systems 106. Multiple input/output devices 1250 may be present in the control system 106 or may be distributed on various nodes of the control system 106. In some implementations, similar input/output devices may be separate from the control system 106 and may interact with one or more nodes of the control system 106 through a wired or wireless connection, such as over the network interface 1240.

As shown in FIG. 12, the memory 1220 may include program instructions 1225 that may be configured to implement one or more of the described implementations and/or provide data storage 1235, which may comprise various tables, data stores and/or other data structures accessible by the program instructions 1225. The program instructions 1225 may include various executable instructions, programs, or applications to facilitate optimized task generation and scheduling operations and processes described herein, such as inbound area controllers, drivers, or applications, buffer area controllers, drivers, or applications, processing station controllers, drivers, or applications, WMS controllers, drivers, or applications, CSS controllers, drivers, or applications, OATS controllers, drivers, or applications, TC controllers, drivers, or applications, AGC controllers, drivers, or applications, various sensor controllers, drivers, or applications, sensor data processing applications, vision system or imaging device controllers, drivers, or applications, imaging data processing applications, material handling equipment controllers, drivers, or applications, various station controllers, drivers, or applications, etc. The data storage 1235 may include various data stores for maintaining data related to systems, operations, or processes described herein, such as an inbound area, buffer areas, processing stations, trolley locations, transport paths, AGCs, trolleys, items, totes or containers, sensor apparatus of the CSS, sensor data from the CSS, configuration data, candidate orders or tasks, task sequences or schedules, optimization factors, variables, and constraints, task logic constraints, space or time constraints, material handling equipment or apparatus, various other systems, stations, or processes, etc.

Those skilled in the art will appreciate that the control system 106 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 106 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 9-11, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An automated guided cart (AGC) task generation and scheduling system, comprising:
   a warehouse management system configured to detect respective states of an inbound area, a plurality of processing stations, and a buffer area;
   a ceiling sensor system configured to detect respective states of a plurality of trolley locations, the plurality of trolley locations associated with respective ones of the inbound area, the plurality of processing stations, and the buffer area, wherein the ceiling sensor system comprises a plurality of laser sensors associated with respective ones of the plurality of trolley locations;
   wherein a first overhead sensor apparatus of the ceiling sensor system associated with a first trolley location of at least one of the inbound area or the plurality of processing stations comprises a first plurality of laser sensors, individual ones of the first plurality of laser sensors configured to detect respective portions of a trolley positioned at the first trolley location; and
   wherein a second overhead sensor apparatus of the ceiling sensor system associated with a second trolley location of the buffer area comprises a single laser sensor, the single laser sensor configured to detect a portion of a trolley positioned at the second trolley location;
   at least one AGC;
   an order management system configured to at least:
      receive, from the warehouse management system, respective states of the inbound area, the plurality of processing stations, and the buffer area;
      receive, from the ceiling sensor system, respective states of the plurality of trolley locations;
      determine a plurality of candidate tasks associated with movement of one or more trolleys between one or more of the plurality of trolley locations by the at least one AGC, based on the respective states of the inbound area, the plurality of processing stations, and the buffer area, and based on the respective states of the plurality of trolley locations;
      receive at least one constraint related to at least one of space or time associated with movement of the one or more trolleys between the one or more of the plurality of trolley locations; and
      determine, from the plurality of candidate tasks, a sequence of tasks based on the at least one constraint; and a traffic controller configured to receive the sequence of tasks, and to instruct the at least one AGC to execute the sequence of tasks;

wherein the at least one AGC executes the sequence of tasks.

2. The system of claim 1, wherein the respective states of the inbound area, the plurality of processing stations, and the buffer area comprise at least one of a type of operation, an operational status, or a rate of processing.

3. The system of claim 1, wherein individual ones of the plurality of laser sensors are configured to detect at least one of a trolley, at least one empty tote, or at least one full tote.

4. The system of claim 1, wherein the order management system comprises an optimized AGC task scheduler that is further configured to at least:
   receive, from the ceiling sensor system, sensor data associated with the respective states of the plurality of trolley locations;
   receive configuration data associated with individual ones of the plurality of trolley locations;
   process, based on the configuration data, the sensor data to detect at least one of a trolley, at least one empty tote, or at least one full tote at the individual ones of the plurality of trolley locations; and
   determine the plurality of candidate tasks associated with movement of one or more trolleys between one or more of the plurality of trolley locations by at least one AGC based on the processed sensor data.

5. The system of claim 1, wherein the order management system comprises an optimized AGC task scheduler that is configured to determine the plurality of candidate tasks and to determine the sequence of tasks using a linear optimization model.

6. A system to schedule automated guided carts (AGCs), comprising:
   an overhead sensor system configured to detect respective states of a plurality of trolley locations, wherein the overhead sensor system comprises a plurality of ranging sensors associated with respective ones of the plurality of trolley locations;
   wherein a first overhead sensor apparatus of the overhead sensor system associated with a first trolley location of at least one of an inbound area or a plurality of processing stations comprises a first plurality of ranging sensors, individual ones of the first plurality of ranging sensors configured to detect respective portions of a trolley positioned at the first trolley location; and
   wherein a second overhead sensor apparatus of the overhead sensor system associated with a second trolley location of a buffer area comprises a single ranging sensor, the single ranging sensor configured to detect a portion of a trolley positioned at the second trolley location;
   at least one AGC;
   an order management system configured to at least:
      receive, from the overhead sensor system, sensor data associated with the plurality of trolley locations;
      determine, based on the sensor data, a plurality of candidate tasks associated with movement of at least one trolley between one or more of the plurality of trolley locations by the at least one AGC; and
      determine, from the plurality of candidate tasks, a sequence of tasks based on at least one constraint related to at least one of space or time; and
   a traffic controller configured to receive the sequence of tasks, and to instruct the at least one AGC to execute the sequence of tasks;
   wherein the at least one AGC executes the sequence of tasks.

7. The system of claim 6, further comprising:
   a warehouse management system configured to detect respective states of at least one of the inbound area, the plurality of processing stations, or the buffer area;
   wherein the order management system is further configured to at least:
      receive, from the warehouse management system, respective states of at least one of the inbound area, the plurality of processing stations, or the buffer area;
      wherein the plurality of candidate tasks are further determined based on the respective states of at least one of the inbound area, the plurality of processing stations, or the buffer area.

8. The system of claim 7, wherein the respective states of at least one of the inbound area, the plurality of processing stations, or the buffer area comprise at least one of a type of operation, an operational status, or a rate of processing.

9. The system of claim 6, wherein the plurality of trolley locations are associated with respective ones of at least one of the inbound area, the plurality of processing stations, or the buffer area.

10. The system of claim 6, wherein the plurality of ranging sensors are configured to detect distances to at least one of surfaces of respective trolley locations, trolleys positioned at the respective trolley locations, or at least one tote carried by the trolleys positioned at the respective trolley locations.

11. The system of claim 6, wherein the order management system is further configured to at least:
   receive configuration data associated with individual ones of the plurality of trolley locations; and
   process, based on the configuration data, the sensor data to detect at least one of a trolley, at least one empty tote, or at least one full tote at the individual ones of the plurality of trolley locations;
   wherein the plurality of candidate tasks are further determined based on the processed sensor data.

12. The system of claim 11, wherein processing, based on the configuration data, the sensor data further comprises:
   determining, at the individual ones of the plurality of trolley locations, at least one of a presence or absence of a trolley, a number of empty totes carried by a trolley, or a number of full totes carried by a trolley.

13. The system of claim 12, wherein processing, based on the configuration data, the sensor data further comprises:
   comparing at least one of the number of empty totes carried by a trolley or the number of full totes carried by a trolley with at least one threshold;
   wherein the plurality of candidate tasks are further determined based on the comparison of at least one of the number of empty totes carried by a trolley or the number of full totes carried by a trolley with at least one threshold.

14. The system of claim 6, wherein the order management system is further configured to at least:
   receive the at least one constraint related to at least one of space or time associated with movement of the at least one trolley between the one or more of the plurality of trolley locations by the at least one AGC;
   wherein the at least one constraint related to at least one of space or time is based on at least one of a rate of processing at a trolley location, a waiting time at a trolley location, a delay time associated with a trolley location, or a travel time of the at least one AGC.

15. A method to schedule automated guided carts (AGCs), comprising:

receiving, by an order management system from an overhead sensor system, sensor data associated with a plurality of trolley locations, wherein the overhead sensor system comprises a plurality of ranging sensors associated with respective ones of the plurality of trolley locations;

wherein a first overhead sensor apparatus of the overhead sensor system associated with a first trolley location of at least one of an inbound area or a plurality of processing stations comprises a first plurality of ranging sensors, individual ones of the first plurality of ranging sensors configured to detect respective portions of a trolley positioned at the first trolley location; and wherein a second overhead sensor apparatus of the overhead sensor system associated with a second trolley location of a buffer area comprises a single ranging sensor, the single ranging sensor configured to detect a portion of a trolley positioned at the second trolley location;

determining, by the order management system based on the sensor data, a plurality of candidate tasks associated with movement of at least one trolley between one or more of the plurality of trolley locations by at least one AGC;

determining, by the order management system from the plurality of candidate tasks, a sequence of tasks based on at least one space or time constraint;

transmitting, by the order management system to a traffic controller, the sequence of tasks to instruct the at least one AGC to execute the sequence of tasks; and causing execution, by the at least one AGC, of the sequence of tasks.

16. The method of claim 15, further comprising:

receiving, by the order management system from a warehouse management system, respective states of at least one of the inbound area, the plurality of processing stations, or the buffer area associated with respective ones of the plurality of trolley locations;

wherein the plurality of candidate tasks are further determined based on the respective states of at least one of the inbound area, the plurality of processing stations, or the buffer area.

17. The method of claim 15, further comprising:

receiving, by the order management system, configuration data associated with individual ones of the plurality of trolley locations; and processing, by the order management system based on the configuration data, the sensor data to detect at least one of a trolley, at least one empty tote, or at least one full tote at the individual ones of the plurality of trolley locations;

wherein the plurality of candidate tasks are further determined based on the processed sensor data.

18. The method of claim 15, further comprising:

receiving, by the order management system, at least one logic constraint associated with movement of the at least one trolley between the one or more of the plurality of trolley locations by the at least one AGC;

wherein the plurality of candidate tasks are further determined based on the at least one logic constraint; and receiving, by the order management system, the at least one space or time constraint associated with movement of the at least one trolley between the one or more of the plurality of trolley locations by the at least one AGC.

19. The method of claim 15, wherein the order management system comprises an optimized AGC task scheduler that is configured to determine the plurality of candidate tasks and to determine the sequence of tasks using a linear optimization model.

* * * * *